(12) United States Patent
Main et al.

(10) Patent No.: US 11,036,190 B2
(45) Date of Patent: *Jun. 15, 2021

(54) AUTOMATED VALIDATION, ESTIMATION, AND EDITING CONFIGURATION SYSTEM

(71) Applicant: ENEL X NORTH AMERICA, INC., Boston, MA (US)

(72) Inventors: Elizabeth J. Main, Madison, WI (US); Wendy Chen, Boston, MA (US)

(73) Assignee: Enel X North America, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/573,281

(22) Filed: Sep. 17, 2019

(65) Prior Publication Data
US 2020/0014203 A1 Jan. 9, 2020

Related U.S. Application Data

(63) Continuation of application No. 15/280,526, filed on Sep. 29, 2016.

(51) Int. Cl.
*G05B 13/02* (2006.01)
*G06Q 50/06* (2012.01)
(Continued)

(52) U.S. Cl.
CPC ........ *G05B 13/026* (2013.01); *G05B 23/0221* (2013.01); *G05B 2219/31483* (2013.01); *G06Q 50/06* (2013.01); *H02J 3/00* (2013.01)

(58) Field of Classification Search
CPC ............ G05B 15/02; G05B 2219/2642; G05B 23/0221; G05B 23/0254; G05B 13/04; Y02B 70/3225
See application file for complete search history.

(56) References Cited

U.S. PATENT DOCUMENTS 5,491,643 A   2/1996   Batchelder
5,684,713 A   11/1997  Asada et al.
(Continued)

OTHER PUBLICATIONS

Fowler, KM et al. "Simplified Processing Method for Meter Data Analysis." Nov. 2015. Pacific Northwest National Laboratory. Richland, WA 99352. Retrieved from the internet at: https://www.pnnl.gov/main/publications/external/technical_reports/PNNL-24331.pdf pp. 1-34.

*Primary Examiner* — Darrin D Dunn
(74) *Attorney, Agent, or Firm* — Richard K. Huffman; Huffman Patent Group, LLC

(57) ABSTRACT

An apparatus for configuring validation, estimation, and editing (VEE) rules for performing VEE on interval-based energy consumption streams includes a data stores, a rules processor, and a process control element. The stores provides tagged data sets each associated with a corresponding one of the streams, each of the sets comprising groups of contiguous interval values tagged as having been validated. The rules processor reads the stores upon initiation of an event and, for the each of the sets, creates anomalies having different durations using only the groups of values, the groups of values corresponding to correct data, and generates estimates for the anomalies by employing estimation techniques for each of the durations and, for the each of the durations, selects a corresponding one of the techniques for subsequent employment when performing VEE of subsequent energy consumption data associated with the each of the durations for the corresponding one of the streams. The control element executes functions on the streams translated by the rules processor, and directs one or more system elements to change state.

20 Claims, 10 Drawing Sheets

(51) Int. Cl.
  *G05B 23/02* (2006.01)
  *H02J 3/00* (2006.01)

(56) References Cited

U.S. PATENT DOCUMENTS

| | | | |
|---|---|---|---|
| 6,748,280 B1 | 6/2004 | Zou et al. |
| 7,557,729 B2 | 7/2009 | Hubbard et al. |
| 7,800,877 B2 | 9/2010 | Zeuch et al. |
| 8,560,092 B2 | 10/2013 | Zheng et al. |
| 8,620,885 B1 | 12/2013 | Gupta et al. |
| 8,756,024 B2 | 6/2014 | Hedley et al. |
| 8,868,993 B1 | 10/2014 | Yu et al. |
| 9,239,760 B2 | 1/2016 | Baone et al. |
| 9,261,863 B2 | 2/2016 | Sloop et al. |
| 9,286,582 B2 | 3/2016 | Drees et al. |
| 9,639,413 B2 | 5/2017 | Drees et al. |
| 9,786,143 B1 | 10/2017 | Al-Mohssen et al. |
| 10,099,372 B2 | 10/2018 | Vu et al. |
| 2002/0147521 A1 | 10/2002 | Mok et al. |
| 2005/0038549 A1 | 2/2005 | Loughran |
| 2005/0234837 A1 | 10/2005 | Ramachandran et al. |
| 2006/0098369 A1 | 5/2006 | Wambsganss et al. |
| 2007/0165835 A1 | 7/2007 | Berkman |
| 2007/0188960 A1 | 8/2007 | Balakrishnan |
| 2008/0028464 A1 | 1/2008 | Bringle et al. |
| 2008/0074284 A1 | 3/2008 | Edwards et al. |
| 2009/0016470 A1 | 1/2009 | van der Laan |
| 2009/0089785 A1 | 4/2009 | Marwinski et al. |
| 2009/0231888 A1 | 9/2009 | Baurle et al. |
| 2010/0058086 A1 | 3/2010 | Lee |
| 2010/0117856 A1 | 5/2010 | Sonderegger |
| 2011/0119042 A1 | 5/2011 | Johnson et al. |
| 2011/0153080 A1 | 6/2011 | Shapiro et al. |
| 2011/0196513 A1 | 8/2011 | Willig et al. |
| 2012/0072039 A1 | 3/2012 | Anderson et al. |
| 2013/0036082 A1 | 2/2013 | Natarajan et al. |
| 2013/0085715 A1 | 4/2013 | Lakshminarayan et al. |
| 2013/0173322 A1 | 7/2013 | Gray |
| 2013/0185437 A1 | 7/2013 | Willig et al. |
| 2013/0204402 A1 | 8/2013 | Mezic et al. |
| 2013/0231790 A1 | 9/2013 | Shao |
| 2013/0325377 A1 | 12/2013 | Drees et al. |
| 2014/0018034 A1 | 1/2014 | Lindberg |
| 2014/0046754 A1 | 2/2014 | Lee et al. |
| 2014/0067121 A1 | 3/2014 | Brooks et al. |
| 2014/0129160 A1 | 5/2014 | Tran |
| 2014/0245071 A1 | 8/2014 | Drees et al. |
| 2014/0325291 A1 | 10/2014 | Spivey et al. |
| 2014/0325292 A1 | 10/2014 | Spivey et al. |
| 2014/0365174 A1 | 12/2014 | Arlitt et al. |
| 2014/0365419 A1 | 12/2014 | Salonidis et al. |
| 2015/0026027 A1 | 1/2015 | Priess et al. |
| 2015/0120224 A1 | 4/2015 | Siebel et al. |
| 2015/0121160 A1 | 4/2015 | Baone et al. |
| 2015/0174766 A1 | 6/2015 | Jägenstedt et al. |
| 2015/0271030 A1 | 9/2015 | Yaros et al. |
| 2015/0371151 A1 | 12/2015 | Georgescu et al. |
| 2016/0012340 A1 | 1/2016 | Georgescu et al. |
| 2016/0132068 A1 | 5/2016 | Drees et al. |
| 2016/0154389 A1 | 6/2016 | Drees et al. |
| 2016/0294186 A1 | 10/2016 | Al-Mohssen et al. |
| 2016/0305848 A1 | 10/2016 | Boggio |
| 2016/0379319 A1 | 12/2016 | Drees et al. |
| 2017/0080565 A1 | 3/2017 | Dalibard et al. |
| 2017/0149325 A1 | 5/2017 | Lau et al. |
| 2017/0200229 A1 | 7/2017 | Price et al. |
| 2017/0317495 A1 | 11/2017 | Pavlovski et al. |
| 2018/0026477 A1 | 1/2018 | Carter et al. |
| 2018/0248381 A1 | 8/2018 | Lewis |
| 2018/0328999 A1 | 11/2018 | Tashima et al. |
| 2019/0030716 A1 | 1/2019 | Chevallereau et al. |
| 2019/0061158 A1 | 2/2019 | Vu et al. |
| 2019/0206268 A1 | 7/2019 | Taveira et al. |
| 2020/0144817 A1 | 5/2020 | Main et al. |
| 2020/0153243 A1 | 5/2020 | Main et al. |

PRESENT DAY NETWORK OPERATIONS CENTER

NETWORK OPERATIONS CENTER INCLUDING VEE CONFIGURATION ENGINE

AUTOMATED BUILDING CONTROL SYSTEM

AUTOMATED VALIDATION, ESTIMATION, AND EDITING CONFIGURATION SYSTEM

This application is a continuation of the following U.S. Patent Application, which is herein incorporated by reference in its entirety.

| SERIAL NUMBER | FILING DATE | TITLE |
|---|---|---|
| 15/280,526 (ENER.0147) | Sep. 29, 1916 | APPARATUS AND METHOD FOR AUTOMATED VALIDATION, ESTIMATION, AND EDITING CONFIGURATION |

This application is related to the following co-pending U.S. Patent Applications, each of which has a common assignee and common inventors.

| SERIAL NUMBER | FILING DATE | TITLE |
|---|---|---|
| (ENER.0147-C2) | | AUTOMATED DETECTION AND CORRECTION OF VALUES IN ENERGY CONSUMPTION STREAMS |
| 15/280,542 (ENER.0148) | Sep. 29, 1916 | AUTOMATED VALIDATION, ESTIMATION, AND EDITING PROCESSOR |
| 15/280,569 (ENER.0149) | Sep. 29, 1916 | NETWORK OPERATIONS CENTER INCLUDING AUTOMATED VALIDATION, ESTIMATION, AND EDITING CONFIGURATION ENGINE |
| 16/406,873 (ENER.0149-C1) | May 8, 1919 | COMFORT CONTROL SYSTEM EMPLOYING AUTOMATED VALIDATION, ESTIMATION AND EDITING RULES |
| 16/406,901 (ENER.0149-C2) | May 8, 1919 | APPARATUS AND METHOD FOR ELECTRICAL USAGE TRANSLATION |
| 15/280,581 (ENER.0150) | Sep. 29, 1916 | APPARATUS AND METHOD FOR AUTOMATED CONFIGURATION OF ESTIMATION RULES IN A NETWORK OPERATIONS CENTER |
| 16/392,975 (ENER.0150-C1) | Apr. 24, 1919 | COMFORT MANAGEMENT SYSTEM EMPLOYING AUTOMATED VALIDATION, ESTIMATION, AND EDITING RULES |
| 16/392,998 (ENER.0150-C2) | Apr. 24, 1919 | BUILDING ELECTRICAL USAGE TRANSLATION SYSTEM |
| 15/280,606 (ENER.0151) | Sep. 29, 1916 | ENERGY BASELINING SYSTEM INCLUDING AUTOMATED VALIDATION, ESTIMATION, AND EDITING RULES CONFIGURATION ENGINE |
| 16/184,353 (ENER.0151-C1) | Nov. 8, 1918 | ENERGY CONTROL SYSTEM EMPLOYING AUTOMATED VALIDATION, ESTIMATION, AND EDITING RULES |
| 16/184,420 (ENER.0151-C2) | Nov. 8, 1918 | METHOD AND APPARATUS FOR AUTOMATED BUILDING ENERGY CONTROL |
| 15/280,622 (ENER.0152) | Sep. 29, 1916 | DEMAND RESPONSE DISPATCH PREDICTION SYSTEM INCLUDING AUTOMATED VALIDATION, ESTIMATION, AND EDITING RULES CONFIGURATION ENGINE |
| 16/210,177 (ENER.0152-C1) | Dec. 5, 1918 | DEMAND RESPONSE DISPATCH SYSTEM INCLUDING AUTOMATED VALIDATION, ESTIMATION, AND EDITING RULES CONFIGURATION ENGINE |
| 16/210,217 (ENER.0152-C2) | Dec. 5, 1918 | METHOD AND APPARATUS FOR DEMAND RESPONSE DISPATCH |
| 15/280,646 (ENER.0153) | Sep. 29, 1916 | BROWN OUT PREDICTION SYSTEM INCLUDING AUTOMATED VALIDATION, ESTIMATION, AND EDITING RULES CONFIGURATION ENGINE |
| 16/248,206 (ENER.0153-C1) | Jan. 15, 1919 | ENERGY CONTROL SYSTEM EMPLOYING AUTOMATED VALIDATION, ESTIMATION, AND EDITING RULES |
| 16/248,230 (ENER.0153-C2) | Jan. 15, 1919 | PEAK ENERGY CONTROL SYSTEM INCLUDING AUTOMATED VALIDATION, ESTIMATION, AND EDITING RULES CONFIGURATION ENGINE |
| 15/280,664 (ENER.0154) | Sep. 29, 1916 | BUILDING CONTROL SYSTEM INCLUDING AUTOMATED VALIDATION, ESTIMATION, AND EDITING RULES CONFIGURATION ENGINE |

-continued

| SERIAL NUMBER | FILING DATE | TITLE |
|---|---|---|
| 16/541,402 (ENER.0154-C1) | Aug. 15, 1919 | AUTOMATED BUILDING CONTROL EMPLOYING VALIDATION, ESTIMATION, AND EDITING RULES |
| 16/541,409 (ENER.0154-C2) | Aug. 15, 1919 | BUILDING CONTROL APPARATUS AND METHOD EMPLOYING AUTOMATED VALIDATION, ESTIMATION, AND EDITING RULES |

BACKGROUND OF THE INVENTION

Field of the Invention

This invention relates in general to the field energy consumption, and more particularly to an apparatus and method for automated metering data validation, estimation, and editing, and applications thereof.

Description of the Related Art

One problem with resources such as electricity, water, fossil fuels, and their derivatives (e.g., natural gas) is related to supply and demand. That is, production of a resource often is not in synchronization with demand for the resource. In addition, the delivery and transport infrastructure for these resources is limited in that it cannot instantaneously match production levels to provide for constantly fluctuating consumption levels. As anyone who has participated in a rolling blackout will concur, the times are more and more frequent when resource consumers are forced to face the realities of limited resource production.

Another problem with resources such as water and fossil fuels (which are ubiquitously employed to produce electricity) is their limited supply along with the detrimental impacts (e.g., carbon emissions) of their use. Public and political pressure for conservation of resources is prevalent, and the effects of this pressure is experienced across the spectrum of resource providers, resource producers and managers, and resource consumers.

It is no surprise, then, that the electrical power generation and distribution community has been taking proactive measures to protect limited instantaneous supplies of electrical power by 1) imposing demand charges on consumers in addition to their monthly usage charge and 2) providing incentives for conservation in the form of rebates and reduced charges. In prior years, consumers merely paid for the total amount of power that they consumed over a billing period. Today, most energy suppliers are not only charging customers for the total amount of electricity they have consumed over the billing period, but they are additionally imposing time of use charges and charging for peak demand. Peak demand is the greatest amount of energy that a customer uses during a measured period of time, typically on the order of minutes. Time of use charges fluctuate throughout the day to dissuade customers from using energy during peak consumption hours. Moreover, energy suppliers are providing rebate and incentive programs that reward consumers for so called energy efficiency upgrades (e.g., lighting and surrounding environment intelligently controlled, efficient cooling and refrigeration, etc.) in their facilities that result in reductions of both peak consumption, time of use consumption shifting, and overall energy consumption. Similar programs are prevalent in the water production and consumption community as well. It is anticipated that such programs will extend to other limited supply energy sources, such as, but not limited to, natural gas, nuclear energy, and other fuel sources.

Demand reduction and energy efficiency programs may be implemented and administered directly by energy providers (i.e., the utilities themselves) or they may be contracted out to third parties, so called energy services companies (ESCOs). ESCOs directly contract with energy consumers and also contract with the energy providers to, say, reduce the demand of a certain resource in a certain area by a specified percentage, where the reduction may be constrained to a certain period of time (i.e., via a demand response program). Or, the reduction effort may be ongoing (i.e., via an energy efficiency program).

The above scenarios are merely examples of the types of programs that are employed in the art to reduce consumption and foster conservation of limited resources. Regardless of the vehicle that is employed, what is important to both producers and consumers is that they be able to understand and appreciate the effects of demand reduction and efficiency improvements that are performed. Sometimes the understanding and appreciation can occur hours, days, or even weeks after the consumption occurs. But the present inventors have observed that there is increasing desire in the art for such understanding and appreciation to occur minutes after the consumption occurs, such as in real time and near real time systems. This disclosure is provided to solve problems that are present in real time and near real time systems.

As one skilled in the art will appreciate, many real time and near real time systems perform operations based on energy consumption data provided by streaming energy consumption metering sources such as smart meters and building automation system meters that measure the energy consumed by one or more corresponding devices and periodically transmit measurements over a conventional wired or wireless network. One skilled will also appreciate that the measurements that are transported over the networks may interspersed with intermittent errors due to power outages, device or metering source malfunctions, weather conditions affecting transmission, network problems, etc.

In fact, streaming data quality and accuracy problems are so common that standardized processes are being developed that set requirements for validation, estimation, and editing (VEE) of metered energy consumption data. These standards address such things as power outages, missing interval values, atypical interval values, suspect groups of interval values, time stamping, reactive energy issues, and a significant number of estimation methods to be employed for particular types of detected anomalies, specific types of meters, and certain known scenarios. Thus, received data must be first validated, that is, examined and tagged either as valid data or anomalous data. Next, estimation techniques are employed to generate estimates for the anomalous data. Finally, editing occurs where the anomalous data is replaced with the estimates, resulting is what is known as post VEE data. The post VEE data is then employed by components within the real time and near real time systems to perform their respective operations and control functions.

Because these systems perform their operations and functions in real time or near real time, the processes that perform VEE are time constrained to provide post VEE data. And these systems attempt to balance processing capacity (and ultimately, cost) with post VEE data accuracy, typically as a function of number of streaming sources processed and the time allocated for VEE processing.

The present inventors have noted that virtually all real time and near real time systems that process a substantial number of energy consumption streams (say, between 50 and 50,000 streams) employ so-called "lightweight" VEE in order to achieve required throughput. As one skilled will appreciate, many different techniques exist to detect and correct anomalous data, where more accurate post VEE data can be had by using techniques that are well suited for individual stream types and anomaly durations. But to tailor VEE techniques for each stream in a system that processes a substantial number of streams would require an inordinate amount of data analyst time and effort. Consequently, lightweight VEE is a compromise, typically employing a small number of VEE techniques for all streams processed by a system. Throughput is achieved, data analyst time is controlled, and post VEE data is accepted as being as accurate as can be had.

The present inventors have also noted, though, that there is increasing desire in the art for more accurate post VEE data for use by real time and near real time systems, over that which is presently available. Accordingly, what is needed is an apparatus and method for automatically configuring VEE techniques in real time and near real time systems.

What is also needed is an automated validation, estimation, and editing processor that configures and dynamically optimizes VEE technique for individual data streams.

What is additionally needed is a network operations center that automatically configures and dynamically optimizes validation, estimation, and editing techniques corresponding to a plurality of energy consumption data streams.

What is furthermore needed is an energy baselining system that automatically configures and dynamically optimizes validation, estimation, and editing techniques corresponding to a plurality of energy consumption data streams.

What is moreover needed is a demand response prediction system that automatically configures and dynamically optimizes validation, estimation, and editing techniques corresponding to a plurality of energy consumption data streams.

What is furthermore needed is a brown out prediction system that automatically configures and dynamically optimizes validation, estimation, and editing techniques corresponding to a plurality of energy consumption data streams.

What is yet additionally needed is a building control system that automatically configures and dynamically optimizes validation, estimation, and editing techniques corresponding to a plurality of energy consumption data streams.

SUMMARY OF THE INVENTION

The present invention, among other applications, is directed to solving the above-noted problems and addresses other problems, disadvantages, and limitations of the prior art. The present invention provides a superior technique for automatically and configuring and dynamically optimizing validation, estimation, and editing techniques corresponding to a plurality of energy consumption data streams that are processed by real time and near real time systems.

One aspect of the present invention contemplates an apparatus for configuring validation, estimation, and editing (VEE) rules for performing VEE on interval-based energy consumption streams. The apparatus includes a post VEE readings data stores, a rules processor, and a process control element. The post VEE readings data stores is configured to provide tagged energy consumption data sets that are each associated with a corresponding one of the interval-based energy consumption streams, each of the tagged energy consumption data sets comprising groups of contiguous interval values tagged as having been validated. The rules processor is configured to read the post VEE readings data stores upon initiation of an event and, for the each of the tagged energy consumption data sets, is configured to create anomalies having different durations using only the groups of contiguous interval values, the groups of contiguous interval values corresponding to correct data, and is configured to generate estimates for the anomalies by employing estimation techniques for each of the different durations and, for the each of the different durations, is configured to select a corresponding one of the estimation techniques for subsequent employment when performing VEE of subsequent energy consumption data associated with the each of the different durations for the corresponding one of the interval based energy consumption streams. The process control element is coupled to the post VEE readings stores, where the process control element executes functions on the interval-based energy consumption streams translated by the rules processor, and directs one or more system elements to change state.

One aspect of the present invention envisages an apparatus for configuring validation, estimation, and editing (VEE) rules for performing VEE on interval-based energy consumption streams. The apparatus has a sources metadata stores, a post VEE readings data stores, a rules processor, and a process control element. The sources metadata stores is configured to provide the rules corresponding to each of the interval-based energy consumption streams for performing VEE. The post VEE readings data stores is configured to provide tagged energy consumption data sets that are each associated with a corresponding one of the interval-based energy consumption streams, each of the tagged energy consumption data sets comprising groups of contiguous interval values tagged as having been validated. The rules processor is configured to read the post VEE readings data stores upon initiation of an event and, for the each of the tagged energy consumption data sets, is configured to create anomalies having different durations using only the groups of contiguous interval values, the groups of contiguous interval values corresponding to correct data, and is configured to generate estimates for the anomalies by employing estimation techniques for each of the different durations and, for the each of the different durations, is configured to select a corresponding one of the estimation techniques for subsequent employment when performing VEE of subsequent energy consumption data associated with the each of the different durations for the corresponding one of the interval based energy consumption streams. The process control element is coupled to the post VEE readings stores, where the process control element executes functions on the interval-based energy consumption streams translated by the rules processor, and directs one or more system elements to change state.

Another aspect of the present invention comprehends a method for configuring validation, estimation, and editing (VEE) rules for performing VEE on interval-based energy consumption streams. The method includes providing tagged energy consumption data sets that are each associated with a corresponding one of the interval-based energy consumption streams, each of the tagged energy consumption data sets comprising groups of contiguous interval values tagged as having been validated; reading the post VEE readings data stores upon initiation of an event; for the each of the tagged energy consumption data sets, creating anomalies having different durations using only the groups of contiguous interval values, the groups of contiguous interval values corresponding to correct data; generating estimates for the anomalies by employing estimation techniques for each of the different durations; for each of the different durations, selecting a corresponding one of the estimation techniques for subsequent employment when performing VEE of subsequent energy consumption data associated with the each of the different durations for the corresponding one of the interval-based energy consumption streams; and executing functions on the interval-based energy consumption streams and directing one or more system elements to change state.

BRIEF DESCRIPTION OF THE DRAWINGS

These and other objects, features, and advantages of the present invention will become better understood with regard to the following description, and accompanying drawings where.

DETAILED DESCRIPTION

Figure 1:
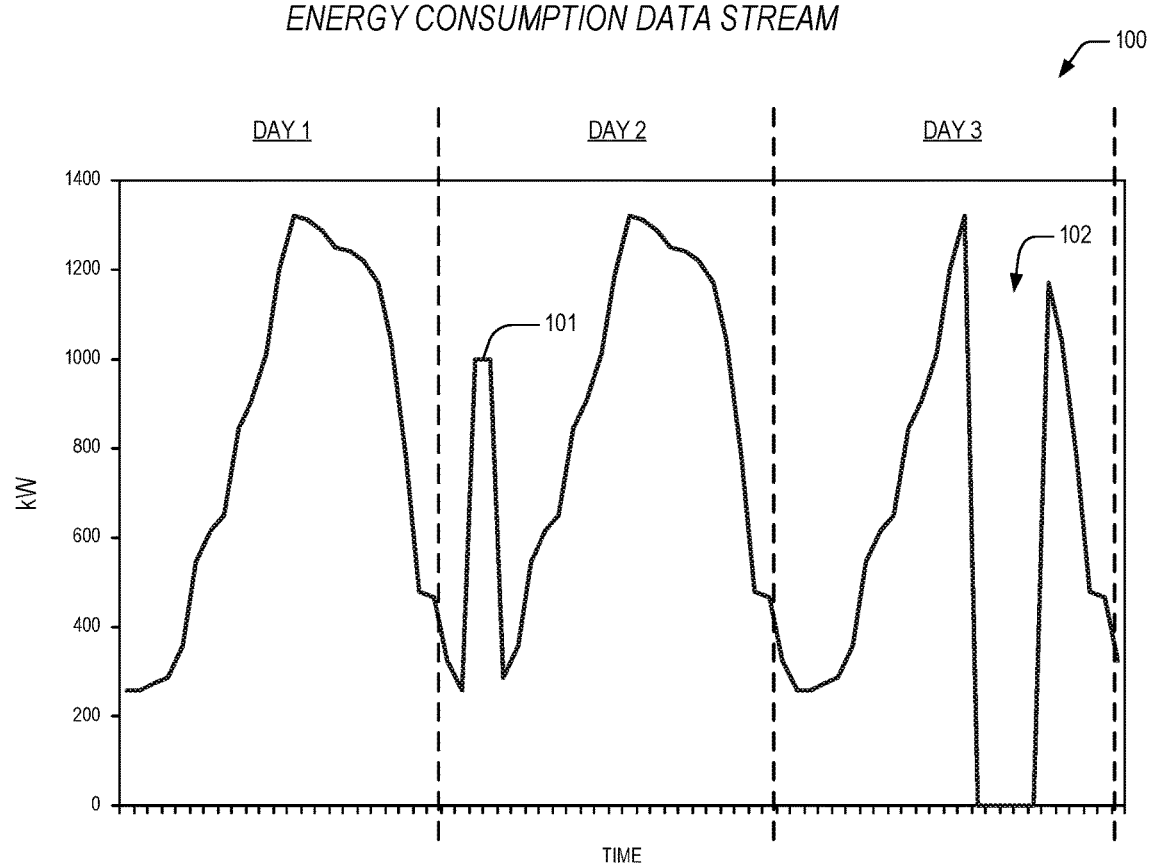
FIG. 1 is a timing diagram illustrating a present day energy consumption stream, such as may be provided by an automatic meter reading (AMR) meter.

Exemplary and illustrative embodiments of the invention are described below. In the interest of clarity, not all features of an actual implementation are described in this specification, for those skilled in the art will appreciate that in the development of any such actual embodiment, numerous implementation specific decisions are made to achieve specific goals, such as compliance with system-related and business related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase.

Figure 2:
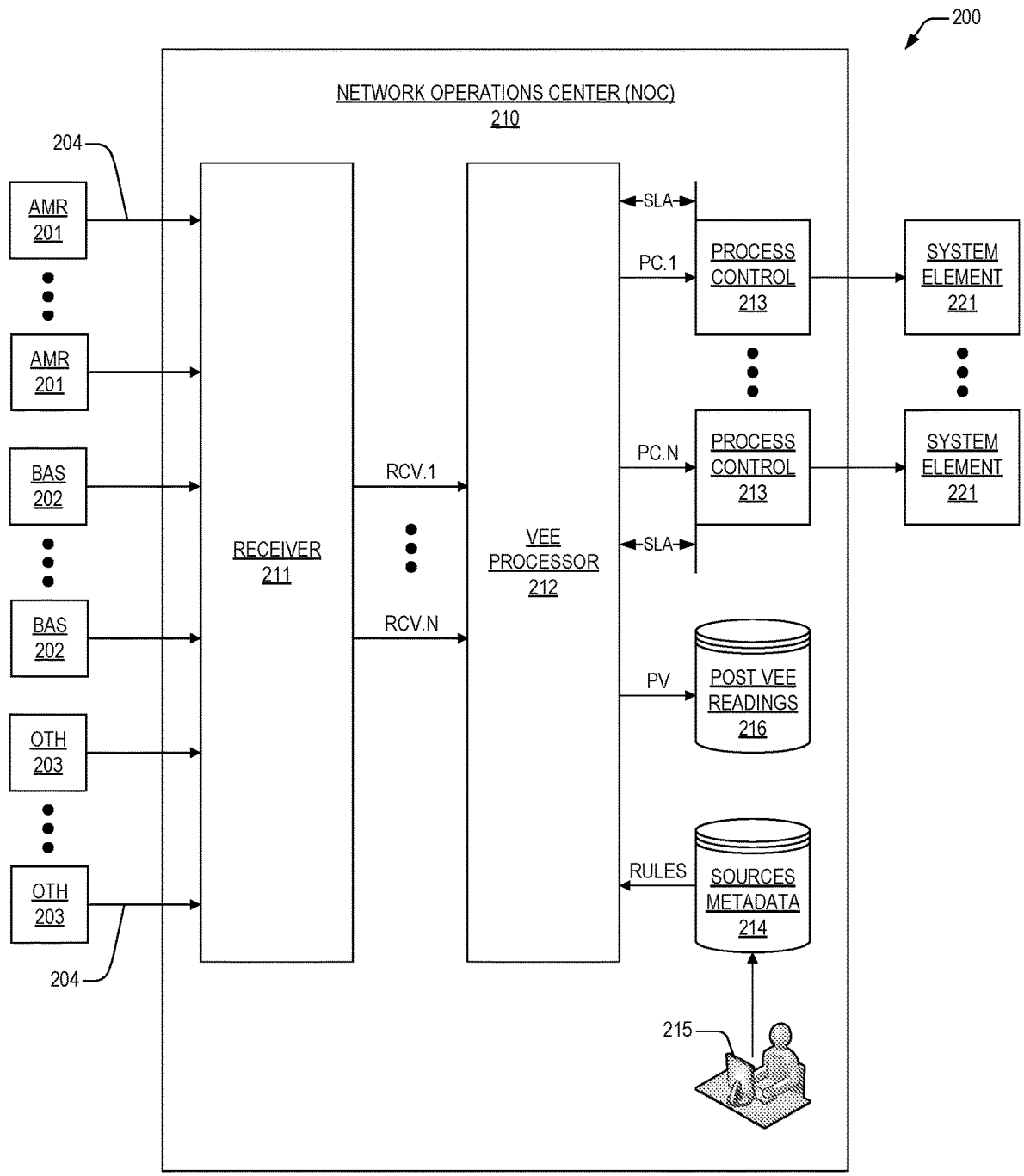
FIG. 2 is a block diagram depicting a present day network operations center (NOC) that employs conventional validation, estimation, and editing (VEE) mechanisms to detect and correct anomalies in a plurality of energy consumption streams.

In view of the above background discussion on metering data validation, estimation and editing (VEE) and associated techniques employed within present day systems to perform VEE for purposes of real time and near real time control, a discussion of the limitations and disadvantages of present day VEE configuration and processing mechanisms will be presented with reference to FIGS. 1-2. Following this, a discussion of the present invention will be provided with reference to FIGS. 3-10. The present invention overcomes the above noted limitations and disadvantages, and others, by providing apparatus and methods for automated VEE rules configuration which exhibit significantly increased accuracies and reduced manpower requirements over that which has heretofore been provided.

Turning to FIG. 1, a timing diagram is presented illustrating a present day energy consumption stream 100, such as may be provided by an automatic meter reading (AMR) meter or similar device that measures, registers, and transmits energy consumption values. As one skilled in the art will appreciate, the stream 100 is representative of energy consumed by a metered entity such as, but not limited to, a house, an apartment, a building, groups of buildings, a substation, a refrigeration unit, an industrial machine, an electrical grid subset, etc. Automated meter reading (AMR) mechanisms abound in the art. These mechanisms register energy consumption and generate and transmit periodic energy consumption data, (i.e., the stream 100), such as is shown in timing diagram. The precise value of the periodic time interval is determined according to specific end use and may typically vary from 24 hours (e.g., a daily consumption value) down to one minute. The stream 100 may be received by entities such as, but not limited to, grid operators, energy service companies (ESCOs), building automation services providers, and network operations centers (NOCs) that employ the stream 100 in conjunction with hundreds to thousands of other streams for purposes of performing control functions (e.g., monthly billing, near real time presentation of energy use versus predicted energy use, occupancy management, energy purchases and trades, grid management, multi-facility building automation, demand response program management, etc.).

Regardless of its end use, it is well known in the art that any number of factors can affect the quality and accuracy of one or more groups of contiguous data points in the stream 100 as the stream 100 is generated, transmitted, and received by a receiving entity. For instance, there may be problems with the metering mechanism itself that result in periodic or aperiodic erroneous data points. There may be intermittent failures within transmission or relay devices that result in in periodic or aperiodic erroneous data points. There may be failures in reception equipment at the destination that result in in periodic or aperiodic erroneous data points. Intermittent power outages due to weather or other causes may occur. The foregoing is not an exhaustive list of factors affecting the quality and accuracy of data that is transmitted in the stream 100, but such factors are sufficient to illustrate that inaccuracies in streaming data are characteristic of this field of art.

Streaming data quality and accuracy problems prevail, so much so that operators, industry groups, regions, and even countries are developing their own standardized processes that set requirements for validation, estimation, and editing of metered energy consumption data. These standards address such things as power outages, missing interval values, atypical interval values, suspect groups of interval values, time stamping, reactive energy issues, and a significant number of estimation methods to be employed for particular types of detected anomalies, specific types of meters, and certain known scenarios.

The energy consumption data stream 100 shown in the timing diagram exhibits two representative anomalies 101-102, where an anomaly is defined as one or more contiguous interval values (i.e., adjacent points in the stream 100) that appear to be erroneous or inaccurate. A first representative anomaly 101 may be due to an abnormally high reading, an abnormally high rate of reading change, or both. A second representative anomaly 102 may be due to a power outage, a meter reading gap (i.e., intermittent meter failure), a zero reading, or a combination of these causes.

As the data stream 100 is received, it is incumbent on an end user to perform VEE in a manner and time frame that is consistent with end use application. For example, if the end use application is monthly billing for energy use, then VEE protocols are applied to the data points in the stream 100 in order to yield highly accurate post-VEE readings. And since billing is not a time critical application, constraints on the computer processing devices required to process the data points in the stream 100 are quite relaxed. At the other extreme are so called real time and near real time end use applications that require accurate post-VEE readings, but which are required to balance accuracy requirements with processing constraints as a function of data stream processing count, computer processing device availability, and service level agreements (SLAs). An SLA, among other parameters, specifies a maximum time for a given computer process to process its input data such that processed data (i.e., output) is provided to a consumer process. In the case of VEE, SLAs according to application will specify maximum times allocated for performing VEE on a received data stream 100 to produce post-VEE data, i.e., data that has been verified, estimated, and edited according to prescribed VEE protocols. The present application focuses on the latter group of end use applications, namely, real time and near real time applications.

Referring now to FIG. 2 a block diagram 200 is presented depicting a present day network operations center (NOC) 210 that employs conventional validation, estimation, and editing (VEE) mechanisms to detect and correct anomalies in a plurality of energy consumption streams 204. The diagram 200 shows representative metering devices 201-203 that generate and transmit the streams 204 such as one or more AMR meters 201, one or more building automation system (BAS) metering devices 202, and one or more other metering devices 203. The other metering devices 203 may directly measure, generate, and transmit streams 204, or they may relay the streams 204, as in the case of a grid operator relaying streaming data to an ESCO. The streams 204 may be transmitted to the NOC 210 by any well-known streaming mechanism such as, but not limited to, wired or wireless networks, radio frequency networks, cellular networks, satellite communications, etc.

The NOC 210 comprises a receiver 211 that is coupled to each of the streams 204 and that performs the functions required to translate signals corresponding to each of the streams 204 into data that is suitable for VEE processing within the NOC 210. Accordingly, the receiver 211 is coupled to a VEE processor 212 via buses RCV.1-RCV.N, each of which comprises received and translated data for a corresponding one of the data streams 204. RCV.1-RCV.N are coupled to the VEE processor 212. The VEE processor 212 is coupled to one or more process control elements 213 via busses PC.1-PC.N. A service level agreement (SLA) may be prescribed for processing of the streams 204 by the VEE processor 212, and may establish a maximum processing time from receipt of the streams 204 by the VEE processor 212 until post-VEE readings are provided to the process control elements 213. The process control elements 213 may be coupled to corresponding system elements 221, which may be internal or external to the NOC 210. In the diagram 200, the system elements 221 are depicted external to the NOC 210. A post-VEE readings stores 216 is coupled to the VEE processor 212 via bus PV. A sources metadata stores 214 may be coupled to the VEE processor 212 via bus RULES. One or more data analyst workstations 215 may be coupled to the sources metadata stores 214.

In operation, a typical NOC 210 may receive tens of thousands of energy consumption data streams 204, and may be constrained by SLA to perform VEE functions on the order of minutes for real time and near real time applications. For purposes of the present application, the present inventors have observed that SLAs of approximately five minutes are typical for such applications, and such maximum processing times to perform VEE functions will be employed hereinafter for purposes of teaching the present invention. Accordingly, the streams 204 are received at the NOC 210 by the receiver 211, which translates signals in the streams 204 into data suitable for execution of VEE functions by the VEE processor 212. As noted above, interval times for the streams 204 may range from approximately one minute up to approximately 24 hours.

As a next interval value is translated for a given stream 204, the VEE processor 212 may employ detection rules to determine if the next interval value comprises an anomaly. If the next interval value is not an anomaly, then it is provided to one or more of the process control elements 213 over buses PC.1-PC.N, as required by application. The next interval value is also provided to the post-VEE readings stores 216 over bus PV, where it is available for other processing functions, if required. If the next interval value is deemed an anomaly, then the VEE processor 212 may employ estimation and editing rules for the given stream 204 to replace (i.e., "edit") the next interval value with an estimated next interval value. The estimated next interval value may be provided to one or more of the process control elements 213 over buses PC.1-PC.N, as required by application. The estimated next interval value is also provided to the post-VEE readings stores 216 over bus PV, where it is available for other processing functions, if required. Each of the data streams 204 have a corresponding set of detection, estimation, and editing rules, which are provided by the sources metadata stores 214 to the VEE processor 212 over bus RULES.

As required by application, post-VEE readings corresponding to one or more of the streams 204 may be provided according to service level agreement to one or more of the process control elements 213. The process control elements 213 may then execute functions on the stream data translated by the receiver 211 and VEE processor 212. According to the results of the executed functions, the process control elements 213 may direct one or more of the system elements 221 to change state. For instance, in an energy efficiency real-time feed where one or more of the system elements 221 comprises a controllable video display, post-VEE data may be translated by the one or more processing elements 213 into real-time electrical usage for a corresponding building along with a weather normalized usage baseline recommendation that allows a building owner to take action regarding current energy usage.

In a present day configuration, when a new stream 204 is added, one or more data analysts 215 are required to generate a set of detection, estimation, and editing rules in the sources metadata stores 214 that corresponds to the new stream 204. Detection rules may comprise, but are not limited to, gap detection, zero value detection, negative reading detection, high-read (i.e., over threshold) detection, threshold setting, etc. Estimation rules are more complex, and may comprise, but are not limited to, average of N preceding and M subsequent interval values, replacement with values from previous day of the week, linear interpolation employing N preceding and M subsequent interval values, replace with data from same time previous week, replace with data from same time last week plus straight line interpolated constant, replace with data from same time previous day plus straight line interpolated constant, replace with average binned data from previous month (e.g., average of all 10:05 Monday interval values), replace with median binned data from previous month (e.g., median of all 10:05 Monday interval values), etc.

The present inventors have observed as well that, because of stringent VEE max processing time constraints, that analysts 215 or entities in authority over the particular application of the NOC 210 (e.g., a grid operator or regional transmission organization) select very simple detection, estimation, and editing rules for most, if not all, data streams 204 that are processed by the NOC 210. Such an approach for performing VEE is taken in order to meet the VEE max processing time while at the same time minimizing very costly labor associated with analyzing individual data streams 204 in order to determine VEE rules that result in more accurate post-VEE data.

In addition, the present inventors have noted that present day systems for performing VEE employ a one-size-fits-all approach to VEE rules, regardless of the duration of each anomaly, which is also referred to as a "gap." For example, as one skilled in the art will appreciate, a gap of one interval, say five minutes, may be more accurately estimated by merely employing a previous interval value (i.e., a first estimation rule), whereas a gap of 14 intervals, say 70 minutes, may be more accurately estimated by replacing the anomalous data with data from same time last week plus straight line interpolated constant (i.e., a second estimation rule). And a gap of 287 intervals, say 23 hours and 55 minutes, may be more accurately estimated by replacing the anomalous data with average binned data from previous month (i.e., a third estimation rule). However, present day VEE systems are not generally configured to 1) group gaps according to duration, or 2) apply estimation rules selected from a plurality of estimation rules according to gap size in order to increase the accuracy of post-VEE readings. This is because, in real time and near real time systems, VEE processing constraints and stream counts (tens of thousands) are prohibitive, thus precluding any reasonable form of data analysis. For non-real time applications, a significant number of data analysts 215 may be employed to configured detection and estimation rules in order to increase the accuracy of post-VEE readings. However, real time applications preclude the use of an army of data analysts 215.

Accordingly, the present inventors have noted that present day VEE systems are limited in that they are labor intensive, since VEE rules for each added data stream 204 must be configured by a data analyst 215, and they are disadvantageous because their estimated post-VEE readings are less accurate than that which is desired, as a result of applying one-size-fits-all estimation rules for all types of streams and for all gap sizes.

The present invention overcomes the above noted limitations and disadvantages, and others, by providing a technique for automatic VEE rules configuration and dynamic VEE rules adjustment, which 1) eliminates labor (i.e., data analyst 215) requirements for configuring VEE rules and 2) employs estimation algorithms that are optimum according to stream type and gap size, thus resulting in remarkable increases in post-VEE readings accuracy for real time and near real time applications. The present invention will now be discussed with reference to FIGS. 3-10.

Figure 3:
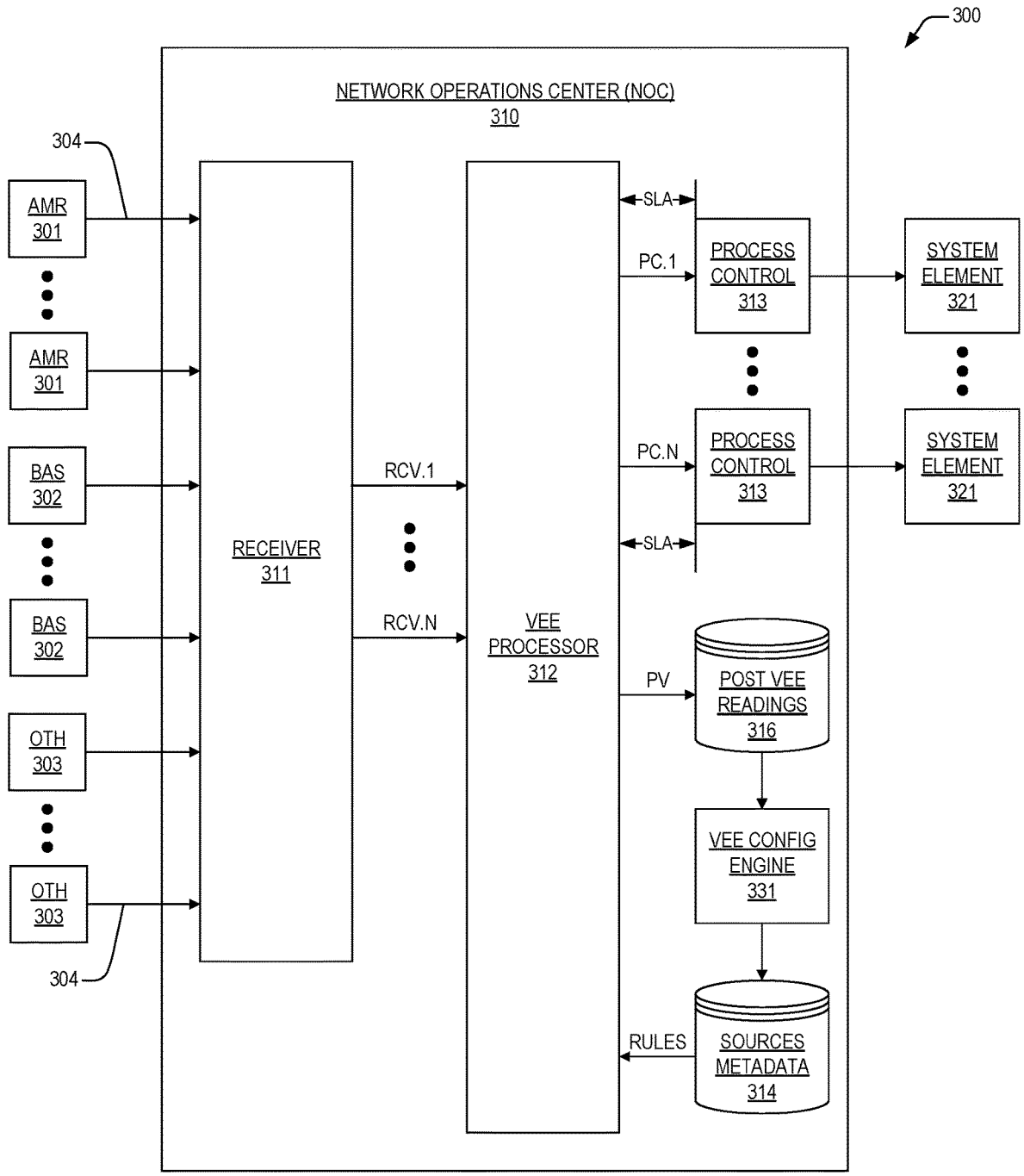
FIG. 3 is a block diagram featuring a network operations center (NOC) according to the present invention that includes an automated VEE rules configuration engine that enables a VEE processor to detect and correct anomalies in a plurality of energy consumption streams.

Turning now to FIG. 3, a block diagram 300 is presented featuring a network operations center (NOC) 310 according to the present invention that includes an automated VEE rules configuration engine 331 that enables a VEE processor 312 to detect and correct anomalies in a plurality of energy consumption streams 304 much more accurately than that which has heretofore been provided.

The diagram 300 shows representative metering devices 301-303 that generate and transmit the streams 304 such as one or more AMR meters 301, one or more building automation system (BAS) metering devices 302, and one or more other metering devices 303. The other metering devices 303 may directly measure, generate, and transmit streams 304, or they may relay the streams 304, as in the case of a grid operator relaying streaming data to an ESCO. The streams 304 may be transmitted to the NOC 310 by any well-known streaming mechanism such as, but not limited to, wired or wireless networks, radio frequency networks, cellular networks, satellite communications, etc.

The NOC 310 comprises a receiver 311 that is coupled to each of the streams 304 and that performs the functions required to translate signals corresponding to each of the streams 304 into data that is suitable for VEE processing within the NOC 310. Accordingly, the receiver 311 is coupled to a VEE processor 312 via buses RCV.1-RCV.N, each of which comprises received and translated data for a corresponding one of the data streams 304. RCV.1-RCV.N are coupled to the VEE processor 312. The VEE processor 312 is coupled to one or more process control elements 313 via busses PC.1-PC.N. A service level agreement (SLA) may be prescribed for processing of the streams 304 by the VEE processor 312, and may establish a maximum processing time from receipt of the streams 304 by the VEE processor 312 until post-VEE readings are provided to the process control elements 313. The process control elements 313 may be coupled to corresponding system elements 321, which may be internal or external to the NOC 310. In the diagram 300, the system elements 321 are depicted external to the NOC 310. A post-VEE readings stores 316 is coupled to the VEE processor 312 via bus PV. A sources metadata stores 314 may be coupled to the VEE processor 312 via bus RULES. A VEE configuration engine 331 may be coupled to both the post-VEE readings stores 316 and the sources metadata stores 314. In contrast to the NOC 210 of FIG. 2, the present invention does not require a data analyst workstation 215 nor any number of data analysts providing input thereto.

In operation, the NOC 310 may receive tens of thousands of energy consumption data streams 304, and may be constrained by SLA to perform VEE functions on the order of minutes for real time and near real time applications. In one embodiment SLAs of approximately five minutes are contemplated, though other SLA processing times may be achieved according to the scope of the present disclosure. Accordingly, the streams 304 are received at the NOC 310 by the receiver 311, which translates signals in the streams 304 into data suitable for execution of VEE functions by the VEE processor 312. In one embodiment, interval times for the streams 304 may range from approximately one minute up to approximately 24 hours.

As a next interval value is translated for a given stream 304, the VEE processor 312 may employ detection rules to determine if the next interval value comprises an anomaly. If the next interval value is not an anomaly, then it is provided to one or more of the process control elements 313 over buses PC.1-PC.N, as required by application. The next interval value is also provided to the post-VEE readings stores 316 over bus PV, where it is available for other processing functions, if required, and may also be accessed by the VEE configuration engine 331. If the next interval value is deemed an anomaly, then the VEE processor 312 may employ estimation and editing rules for the given stream 304 to replace (i.e., "edit") the next interval value with an estimated next interval value. The estimated next interval value may be provided to one or more of the process control elements 313 over buses PC.1-PC.N, as required by application. The estimated next interval value is also provided to the post-VEE readings stores 316 over bus PV, where it is available for other processing functions, if required. Each of the data streams 304 have a corresponding set of detection, estimation, and editing rules, which are provided by the sources metadata stores 314 to the VEE processor 312 over bus RULES.

As required by application, post-VEE readings corresponding to one or more of the streams 304 may be provided according to service level agreement to one or more of the process control elements 313. The process control elements 313 may then execute functions on the stream data translated by the receiver 311 and VEE processor 312. According to results of the executed functions, the process control elements 313 may direct one or more of the system elements 321 to change state. For instance, in an building automation system embodiment, where one or more of the system elements 321 comprises a controllable building comfort management system, post-VEE data may be translated by the one or more processing elements 313 into control signals to direct heating, ventilation, and air-conditioning (HVAC) subsystems in a corresponding building along to cycle, to decelerate schedules, to accelerate schedules, and etc., as a function of the post-VEE data, thus enabling the building automation system to adjust comfort in accordance with power consumed in real time.

In contrast to a present day configuration, the present invention provides for automatic configuration and dynamic optimization of VEE rules for all streams 304 that are processed by the VEE processor 312. Accordingly, when a new stream 304 is added, the VEE configuration engine 331 generate a default set of detection, estimation, and editing rules in the sources metadata stores 314 that corresponds to the new stream 304. Detection rules may comprise, but are not limited to, gap detection, zero value detection, negative reading detection, high-read (i.e., over threshold) detection, threshold setting, etc. Estimation rules are more complex, and may comprise, but are not limited to, average of N preceding and M subsequent interval values, replacement with values from previous day of the week, linear interpolation employing N preceding and M subsequent interval values, replace with data from same time previous week, replace with data from same time last week plus straight line interpolated constant, replace with data from same time previous day plus straight line interpolated constant, replace with average binned data from previous month (e.g., average of all 10:05 Monday interval values), replace with median binned data from previous month (e.g., median of all 10:05 Monday interval values), etc.

The VEE configuration engine 331 thereafter periodically accesses the post VEE readings stores 314 to analyze post VEE readings for the new stream 304 and for all other streams 304 processed by the NOC 310 to 1) adjust detection rules, 2) to group gaps in each stream 304 according to gap size (i.e. duration of contiguous anomalous intervals in each stream 304), and 3) to assign optimum estimation and editing rules for each gap size group in each of the streams 304. In one embodiment, the VEE configuration engine 331 performs these noted functions serially on one stream 304 at a time, until all streams 304 have been analyzed and their corresponding VEE rules have been updated. In one embodiment, the VEE configuration engine 331 performs its analysis and rules optimization functions continuously. In another embodiment, the VEE configuration engine 331 performs its analysis and rules optimization functions as a function of system processing load, where processing loads less than a threshold value enables the VEE configuration engine 331 to execute its functions, and processing loads greater than the threshold precludes execution of its functions. In one embodiment, the threshold is 50 percent. In a further embodiment, the VEE configuration engine 331 cycles serially through all the streams 304 every 24 hours. In yet a further embodiment, the VEE configuration engine 331 cycles serially through all the streams 304 every seven days. In yet another embodiment, the VEE configuration engine 331 cycles serially through all the streams once a month.

Advantageously, the NOC 310 according to the present invention requires little, if any, data analyst support for establishing and optimizing VEE rules for individual streams. In addition, the VEE configuration engine 331 according to the present invention dynamically optimizes VEE rules for each different gap size in individual streams 304, as will be described in further detail below, by analyzing post VEE readings for the streams 304, thus minimizing labor costs and maximizing accuracy of post VEE readings. Detection rules for a given stream 304 may be optimized by analyzing post-VEE readings corresponding to other streams 304 that are of similar device type, similar transmission medium, and similar interval values. Accordingly, values of detection rules such as rate of reading change, high read, dropped reading, etc., are dynamically adjusted for the given stream 304. Estimation and editing rules for a given stream 304 may be optimized by employing non-edited post VEE readings for the given stream 304 to create a substantial number of anomalies for all gap sizes, executing all estimation and editing rules for each of the created anomalies, and selecting an estimation and editing rule for each gap size that minimizes error between estimated and edited interval data points and true post VEE readings from which the anomalies were created. In one embodiment, the number of created anomalies per stream 304 is greater than 10,000, and an estimation and editing rule for each gap size is selected that minimizes root mean squared (RMS) error between estimated and edited interval data points and true post VEE readings. In one embodiment, the VEE configuration engine 331 may employ up to 25 types of detection rules along with associated threshold values such as, but not limited to, the detection rules alluded to above. In one embodiment, the VEE configuration engine 331 may employ up to 25 types of estimation and editing rules such as, but not limited to, the estimation and editing rules alluded to above.

After a given stream 304 has been processed, the VEE configuration engine 331 updates VEE rules for the stream 304 in the sources metadata stores to replace previous VEE rules with updated, optimized VEE rules. A VEE rules record for the given stream 304 in the sources metadata stores 314 may comprise the following fields: STREAMID, STREAM TYPE, TRANSPORT TYPE, DETECTION RULE 1 (OPTIONAL THRESHOLD 1), ... DETECTION RULE 25 (OPTIONAL THRESHOLD 25), GAP SIZE 1, ESTIMATION/EDIT RULE 1, ... GAP SIZE N, ESTIMATION/EDIT RULE N; where N equals the number of gap sizes for the given stream 304. In one embodiment, gap sizes for all streams 304 are: 0-15 minutes, 15-60 minutes, 1-4 hours, 4-24 hours, 1-4 days, and greater than four days. Thus, one of up to 25 estimation and editing rules is selected for each of the six above gap sizes, where the select estimation and editing rule maximizes accuracy of post VEE readings for its corresponding anomaly gap size.

Figure 4:
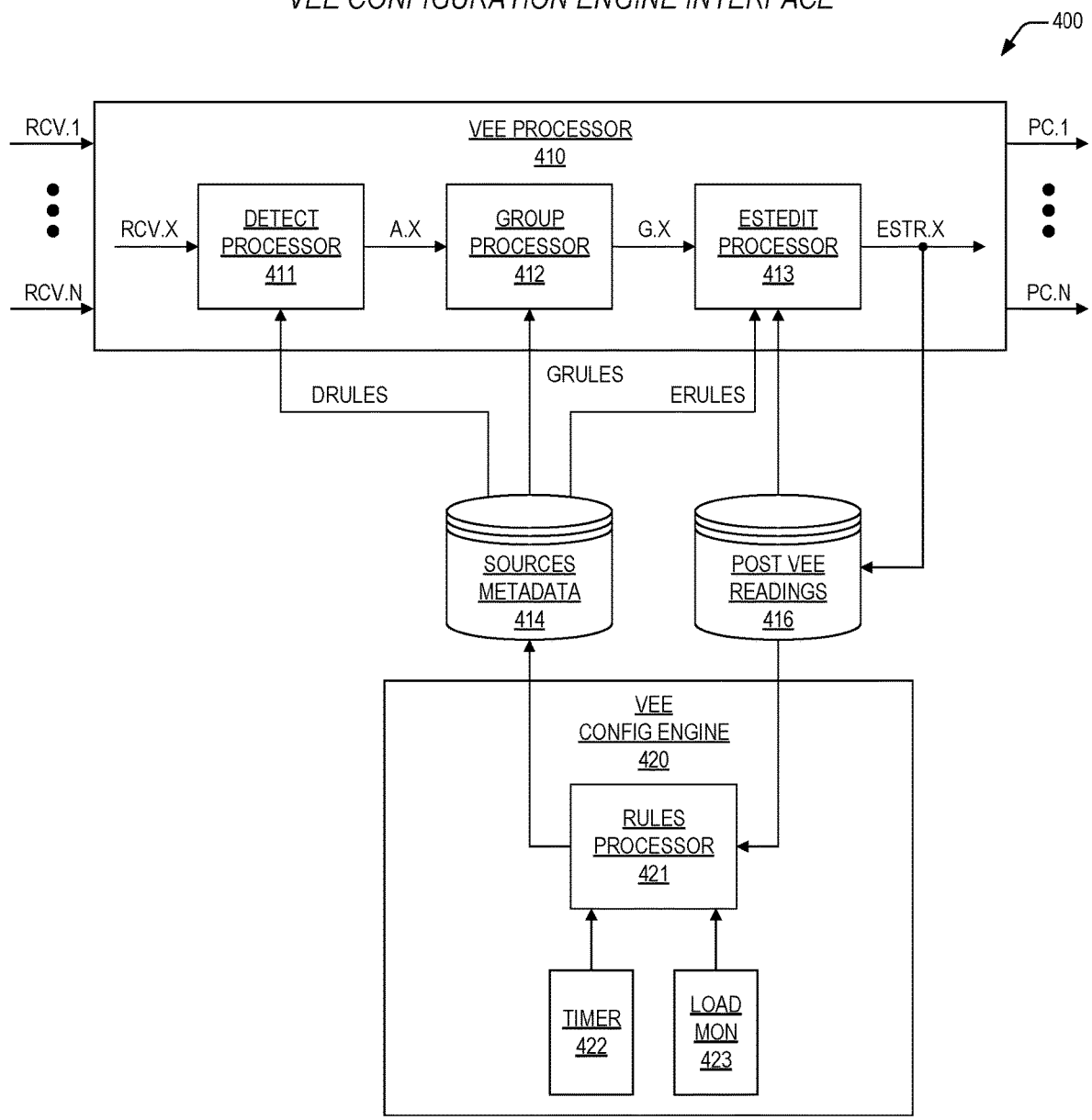
FIG. 4 is a block diagram showing how a VEE configuration engine according to the present invention interfaces to a VEE processor.

Now referring to FIG. 4, a block diagram 400 is presented showing how a VEE configuration engine 420 according to the present invention interfaces to a VEE processor 410. The VEE processor 410 may select one of N received streams RCV.1-RCV.N. A selected stream RCV.X is provided to a detect processor 411. The detect processor 411 is coupled to a group processor 412 via an anomaly bus A.X. The group processor 412 is coupled to an estimation/edit processor 413 via a grouped anomaly bus G.X. The estimation/edit processor 413 generates an estimated and edited stream on bus ESTR.X, which is coupled to a post VEE readings stores 416, and which may be provided to one or more process control buses PC.1-PC.N within a NOC. The estimation/edit processor 413 may also access the post VEE readings stores 416 to obtain post VEE readings for selected stream RCV.X at one or more previous times to estimate readings corresponding to detected anomalies.

The VEE processor 410 may access a sources metadata stores 414 to provide optimized detection rules to the detect processor 411 via bus DRULES, group sizing rules to the group processor 411 via bus GRULES, and optimized estimation/editing rules to the estimation/edit processor 413 via bus ERULES.

The VEE configuration engine 420 comprises a rules processor 421 that is coupled to a timer 422 and a processing load monitor 423. The VEE configuration engine 420 is coupled to both the sources metadata stores 414 and the post VEE readings stores 416.

In operation, as discussed above with reference to FIG. 3, the VEE processor 410 functions to VEE operations on energy consumption data corresponding to a plurality of streams RCV.1-RCV.N to generate post VEE readings for storage in the post VEE readings stores 416, and which may be provided to one or more process control elements via buses PC.1-PC.N for purposes according to application for the NOC. As stream data is available, the VEE processor 410 must perform these VEE operations in accordance with service license agreement in order to present corrected and timely post VEE readings to the one or more process control elements. In one embodiment, a plurality of VEE processors 410 are disposed within the NOC to allow for simultaneous VEE processing of a corresponding plurality of data streams in order to meet throughput requirements according to number of data streams and interval timing within each of the data streams. Accordingly, the detect processor 411 detects anomalies in the stream data according to detection rules provided over bus DRULES. A detected anomaly is declared to the group processor over A.X, which includes interval time for the stream and number of anomalous contiguous interval points.

The group processor 412 employs grouping rules that indicate specific sizes of groups for the stream, and generates a group size along with the declared anomaly on G.X. The declared anomaly and its group size are read by the estimation/edit processor 413, which accesses the sources metadata stores 414 to obtain the optimum estimation rule for the provided group size. The estimation/edit processor 413 may then generate estimated interval data points corresponding to the anomalous interval data points by employing estimation techniques prescribed by the optimum estimation/edit rule. The estimation/edit processor 413 may then replace the anomalous interval data points with the estimated interval data points and will tag the estimated interval data points as corresponding to anomalous data. The estimation/edit processor 413 may buffer data points (those estimated and those not declared anomalous) provided subsequently for use in generating estimated interval data points for a current anomalous interval. The estimation/edit processor 413 may retrieve previously stored data points (those estimated and those not declared anomalous) from the post VEE readings stores 416 for use in generating estimated interval data points for the current anomalous interval. Stream data that is not anomalous is passed through the VEE processor 410 to bus ESTR.X as received over RCV.X and is tagged at not being anomalous.

As discussed above with reference to FIG. 3, the VEE configuration engine 420 may process one or more data streams at a periodic interval (as indicated by the timer 422), as a function of processing load within the NOC (as indicated by the load monitor 423) or both as a function of processing load and a periodic interval. Accordingly, when triggered by the timer 422, load monitor 423, or both the timer 422 and load monitor 423, the rules processor 421 accesses data points corresponding to a next stream from the post VEE readings stores 416 and executes the functions noted above to optimize the next stream's detection and estimation/editing rules, which are then updated in the sources metadata stores 414. For applicable detection rules processing, the rules processor 421 may also retrieve data points from streams of like device type, transport type, etc. in order to optimize detection thresholds.

Figure 5:
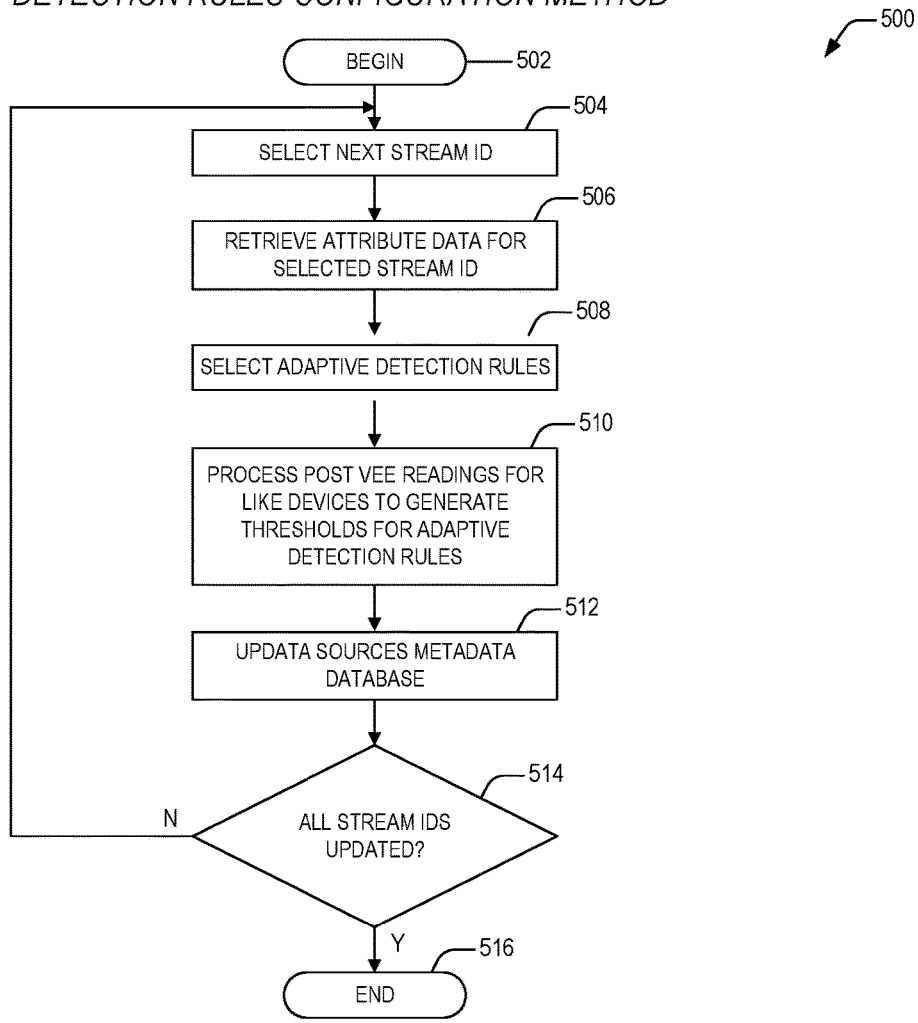
FIG. 5 is a flow diagram illustrating a method according to the present invention for automatically configuring detection rules for use by a VEE processor.

Now turning to FIG. 5, a flow diagram is presented illustrating a method according to the present invention for automatically configuring detection rules for use by a VEE processor. Flow begins at block 502, when a trigger, as described above with reference to FIG. 4 is generated indicating that a next stream is to be processed. Flow then proceeds to block 504.

At block 504, a next stream identifier is selected for detection rules optimization. Flow then proceeds to block 506.

At block 506, attribute data (e.g., STREAM TYPE, TRANSPORT TYPE) is retrieved for the next stream identifier. Flow then proceeds to block 508.

At block 506, adaptive detection rules for the next stream identifier are retrieved from the sources metadata stores. Flow then proceeds to block 510.

At block 510, post VEE readings for streams having like stream type, transport type, or both are processed to generate optimum thresholds for the retrieved adaptive detection rules. Flow then proceeds to block 512.

At block 512, the adaptive detection rules are updated with the generated optimum thresholds and these updated rules are provided to the sources metadata stores. Flow then proceeds to decision block 514.

At decision block 514, an evaluation is made to determine if all streams processed by the NOC have been updated. If not, then flow proceeds to block 504. If so, the flow proceeds to block 516.

At block 516, the method completes.

Figure 6:
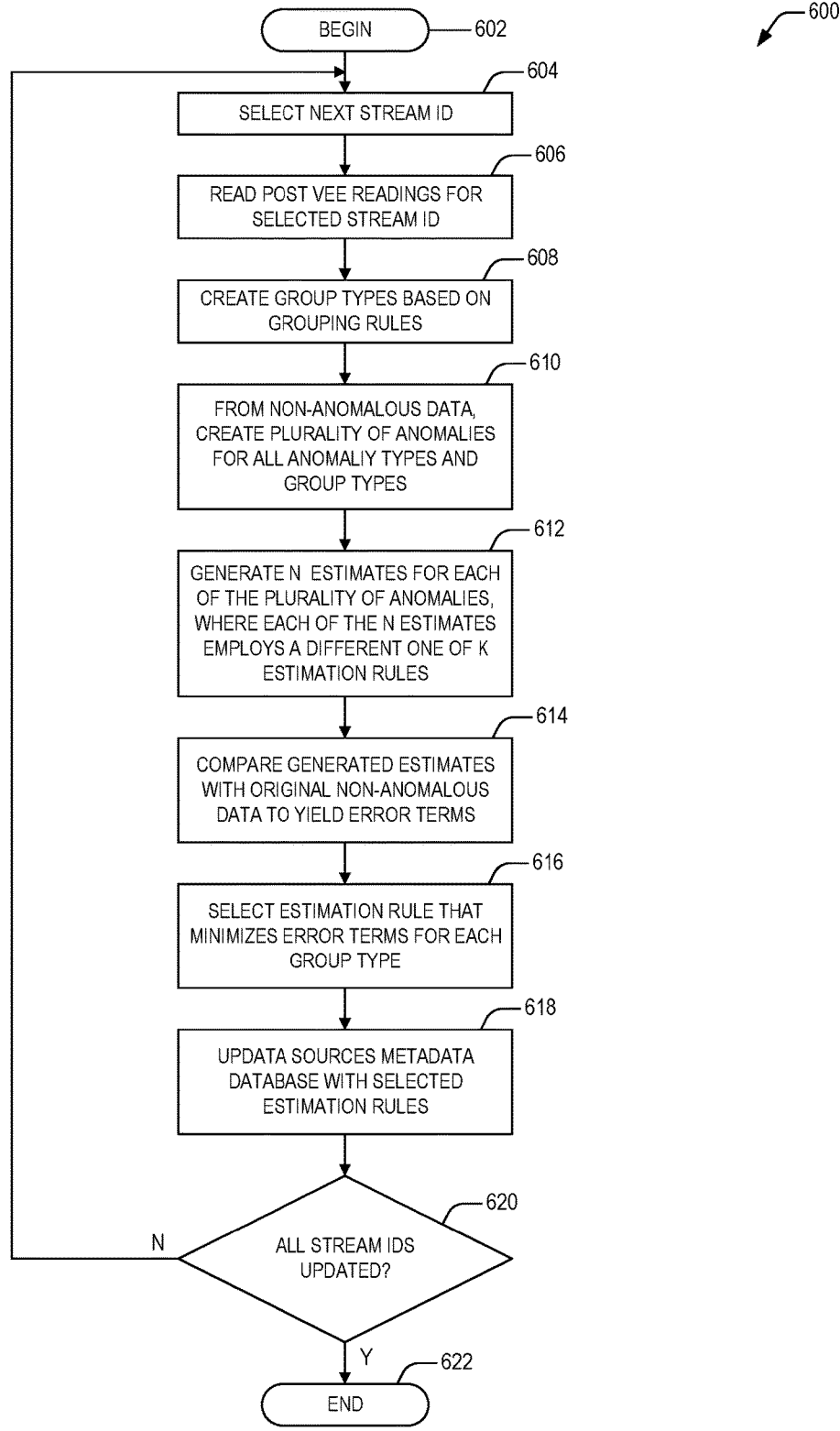
FIG. 6 is a flow diagram detailing a method according to the present invention for automatically configuring estimation rules for use by a VEE processor.

Now turning to FIG. 6, a flow diagram is presented detailing a method according to the present invention for automatically configuring estimation rules for use by a VEE processor. Flow begins at block 602 when a trigger, as described above with reference to FIGS. 4 and 5 is generated indicating that a next stream is to be processed. Flow then proceeds to block 604.

At block 604, a next stream identifier is selected for estimation/editing rules optimization. Flow then proceeds to block 606.

At block 606, post VEE readings for the selected next stream identifier are retrieved from the post VEE readings stores. Flow then proceeds to block 608.

At block 608, group types for all gap sizes associated with the selected stream are created. Flow then proceeds to block 610.

At block 610 post VEE readings for the selected stream 304 that have been previously tagged as not being anomalous (i.e., they correspond to correct data) are employed to create a substantial number of created anomalies for all group types associated with the selected stream. Flow then proceeds to block 612.

At block 612, all estimation/editing rules employed by the NOC are employed to generate estimated interval data for each of the created anomalies. Flow then proceeds to block 614.

At block 614, all estimated interval data for created anomalies within each group type are compared to true post VEE readings from which the anomalies were created, and error terms for each one of the estimation/editing rules employed are generated. Flow then proceeds to bock 616.

At block, 616, an estimation/editing rule for each group type is selected such that error between estimated interval data points and true post VEE readings from which the anomalies were created is minimized. Flow then proceeds to block 618.

At block 618, the sources metadata stores is updated for the selected stream, replacing former estimation/editing rules for each gap type with the rules selected in block 616, thus providing increased VEE accuracy for future interval data from the selected stream. Flow then proceeds to decision block 620.

At decision block 620, an evaluation is made to determine if all streams processed by the NOC have been updated. If not, then flow proceeds to block 604. If so, the flow proceeds to block 622.

At block 622, the method completes.

The present inventors note that estimated/edited interval data for a newly added stream experiencing anomalies may exhibit accuracies commensurate with present day techniques. However, as more and more interval data for that stream is processed by the NOC (and stored in the post VEE readings stores for auto optimization by the VEE configuration engine), accuracies will begin to markedly surpass present day systems. In embodiments that perform VEE associated with residential, office, and industrial buildings, by the time three months of interval data has been processed, the present invention will have configured optimum VEE rules for the stream.

Figure 7:
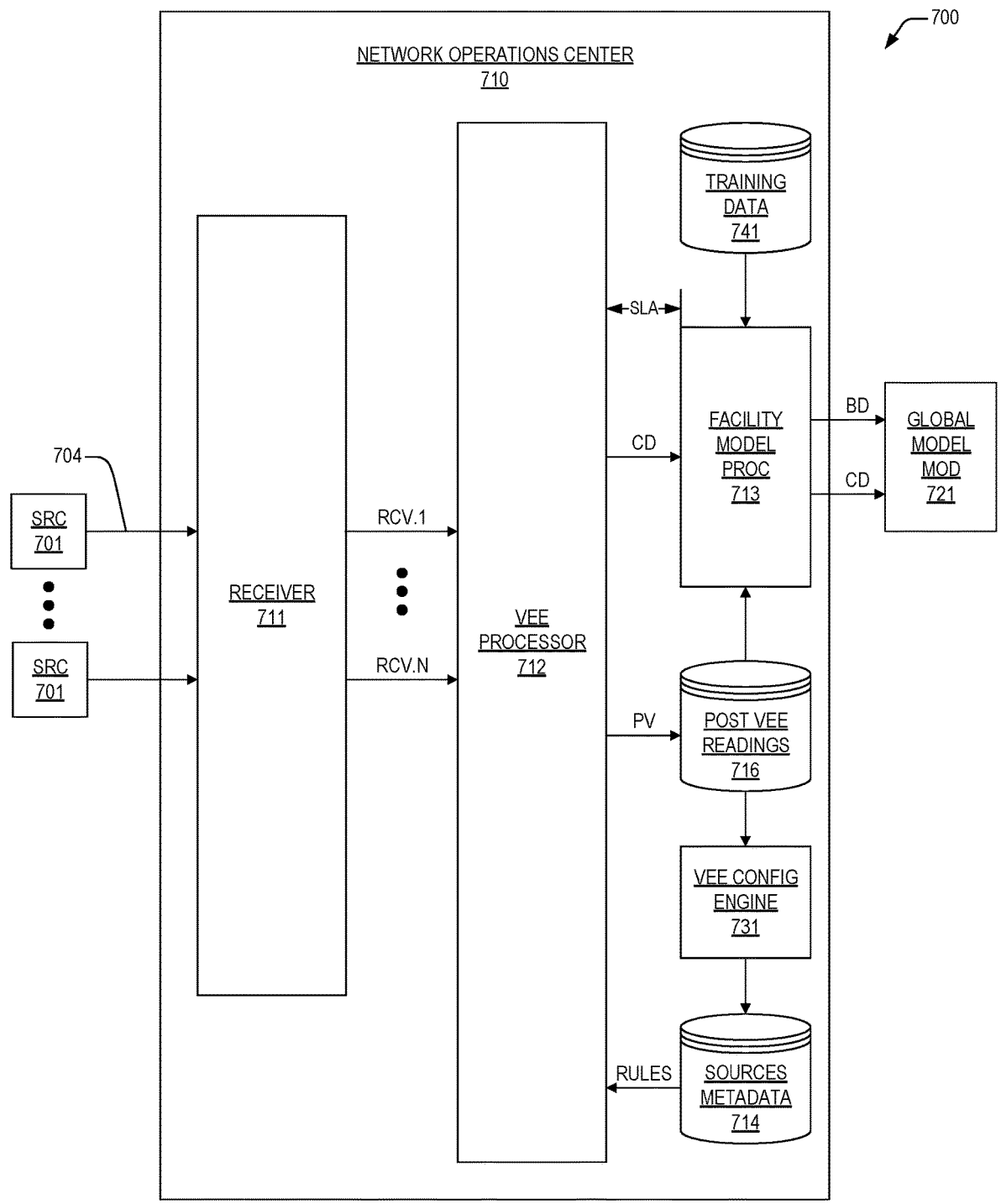
FIG. 7 is a block diagram illustrating an energy baselining system according to the present invention that includes an automated VEE rules configuration engine.

Turning now to FIG. 7, a block diagram is presented illustrating an energy baselining system 700 according to the present invention that includes an automated VEE rules configuration engine 731. The system 700 includes representative metering sources 701that generate and transmit the streams 704 such as one or more AMR meters, one or more building automation system (BAS) metering devices, and one or more other metering devices. The other metering devices may directly measure, generate, and transmit streams 704, or they may relay the streams 704, as in the case of a grid operator relaying streaming data to an ESCO. The streams 704 may be transmitted to the NOC 710 by any well-known streaming mechanism such as, but not limited to, wired or wireless networks, radio frequency networks, cellular networks, satellite communications, etc.

The NOC 710 comprises a receiver 711 that is coupled to each of the streams 704 and that performs the functions required to translate signals corresponding to each of the streams 704 into data that is suitable for VEE processing within the NOC 710. Accordingly, the receiver 711 is coupled to a VEE processor 712 via buses RCV.1-RCV.N, each of which comprises received and translated data for a corresponding one of the data streams 704. RCV.1-RCV.N are coupled to the VEE processor 712. The VEE processor 712 is coupled to a facility model processor 713 via bus CD. A service level agreement (SLA) may be prescribed for processing of the streams 704 by the VEE processor 712, and may establish a maximum processing time from receipt of the streams 704 by the VEE processor 712 until post-VEE readings are provided to the facility model processor 713. The facility model processor 713 may be coupled to a global model module 721, which may be internal or external to the NOC 710. In the energy baselining system 700, the global model module is depicted external to the NOC 710. A post-VEE readings stores 716 is coupled to the VEE processor 312 via bus PV and to the facility model processor 713. A training data stores 741 is coupled to the facility model processor 713. A sources metadata stores 714 may be coupled to the VEE processor 712 via bus RULES. A VEE configuration engine 731 according to the present invention may be coupled to both the post-VEE readings stores 716 and the sources metadata stores 714.

In operation, the NOC 710 may receive the energy consumption data streams 704, and may be constrained by SLA to perform VEE functions on the order of minutes. In one embodiment SLAs of approximately five minutes are contemplated, though other SLA processing times may be achieved according to the scope of the present disclosure. Accordingly, the streams 704 are received at the NOC 710 by the receiver 711, which translates signals in the streams 704 into data suitable for execution of VEE functions by the VEE processor 712. In one embodiment, interval times for the streams 704 may range from approximately one minute up to approximately 24 hours.

As a next interval value is translated for a given stream 704, the VEE processor 712 may employ detection rules to determine if the next interval value comprises an anomaly. If the next interval value is not an anomaly, then it is provided to the facility model processor 713 over bus CD. The next interval value is also provided to the post-VEE readings stores 716 over bus PV, where it is available for functions executed by the facility model processor 713, and may also be accessed by the VEE configuration engine 731. If the next interval value is deemed an anomaly, then the VEE processor 712 may employ estimation and editing rules for the given stream 704 to replace (i.e., "edit") the next interval value with an estimated next interval value. The estimated next interval value may be provided to the facility model processor 713 over bus CD. The estimated next interval value is also provided to the post-VEE readings stores 716 over bus PV, where it is available for functions executed by the facility model processor 713. Each of the data streams 704 have a corresponding set of detection, estimation, and editing rules, which are provided by the sources metadata stores 714 to the VEE processor 712 over bus RULES.

When a new stream 704 is added, the VEE configuration engine 731 generates a default set of detection, estimation, and editing rules in the sources metadata stores 714 that corresponds to the new stream 704. Detection rules may comprise, but are not limited to, gap detection, zero value detection, negative reading detection, high-read (i.e., over threshold) detection, threshold setting, etc. Estimation rules may comprise, but are not limited to, average of N preceding and M subsequent interval values, replacement with values from previous day of the week, linear interpolation employing N preceding and M subsequent interval values, replace with data from same time previous week, replace with data from same time last week plus straight line interpolated constant, replace with data from same time previous day plus straight line interpolated constant, replace with average binned data from previous month (e.g., average of all 10:05 Monday interval values), replace with median binned data from previous month (e.g., median of all 10:05 Monday interval values), etc.

The VEE configuration engine 731 thereafter periodically accesses the post VEE readings stores 714 to analyze post VEE readings for the new stream 704 and for all other streams 704 processed by the NOC 710 to 1) adjust detection rules, 2) to group gaps in each stream 704 according to gap size (i.e. duration of contiguous anomalous intervals in each stream 704), and 3) to assign optimum estimation and editing rules for each gap size group in each of the streams 704. In one embodiment, the VEE configuration engine 731 performs these noted functions serially on one stream 704 at a time, until all streams 704 have been analyzed and their corresponding VEE rules have been updated. In one embodiment, the VEE configuration engine 731 performs its analysis and rules optimization functions continuously. In another embodiment, the VEE configuration engine 731 performs its analysis and rules optimization functions as a function of system processing load, where processing loads less than a threshold value enables the VEE configuration engine 731 to execute its functions, and processing loads greater than the threshold precludes execution of its functions. In one embodiment, the threshold is 50 percent. In a further embodiment, the VEE configuration engine 731 cycles serially through all the streams 704 every 24 hours. In yet a further embodiment, the VEE configuration engine 731 cycles serially through all the streams 704 every seven days. In yet another embodiment, the VEE configuration engine 731 cycles serially through all the streams once a month.

After a given stream 704 has been processed, the VEE configuration engine 731 updates VEE rules for the stream 704 in the sources metadata stores to replace previous VEE rules with updated, optimized VEE rules.

The global model module 721 may be configured as an energy management control device, described in further detail below, or as an energy profile evaluation device. As an energy profile evaluation device, the global model module 721 may include a display such as, but not limited to, a wall-mounted display, a desktop display, a laptop display, a tablet display, or a mobile phone display.

In operation, the energy baselining system 700 according to the present invention may be employed for purposes of generating an accurate facility energy consumption model for a given facility or building, or groups of buildings having time increments of two hours or less (i.e., 1-hour increments, 30-minute increments, 15-minute increments, etc.), and for purposes of employing the energy consumption model to compare energy consumption data derived from the energy consumption data (as edited by the VEE processor 712) provided over CD and post VEE readings with baseline energy consumption data derived from training data provided from the training data stores 741, and further to forecast energy consumption for future dates. In one embodiment, the training data comprises interval based energy consumption data for the facility (or groups) for a previous time period. In one embodiment, the duration of the time period is three months. In another embodiment, the duration of the time period is one year. The facility energy consumption model, as will be described in more detail below, may comprise a lower bound component of building energy consumption as a function of outside temperature, an upper bound component of building energy consumption as a function of outside temperature, etc. The aforementioned components are generated by the facility model processor 713 based upon the values of historical energy consumption training data provided from the training data stores 741. In one embodiment, the aforementioned components may be generated based upon the values of the training data and progressively revised (i.e., iterated) based upon the values of energy consumption data provided over bus CD. The facility model processor 713 may normalize the baseline energy consumption data derived from the training data to remove the effects of outside temperature, resulting in normalized baseline energy consumption data. The facility model processor 713 may also normalize the energy consumption data provided over CD and from post VEE readings to remove the effects of outside temperature, resulting in normalized energy consumption data.

Thereafter, the global model module 721 may generate and display comparisons of the normalized energy consumption data with the normalized baseline energy consumption data for purposes of enabling a building manager to evaluate the efficacy of energy efficiency improvements performed on the facility subsequent to generation of the training data and prior to generation of the energy consumption data. In another embodiment, the global model module 721 may generate comparisons of the normalized energy consumption with the normalized baseline energy consumption data for purposes of enabling a building manager to retroactively visualize the efficacy of energy efficiency improvements performed on the facility prior to generation of the training data and subsequent to generation of the energy consumption data. In an additional embodiment, the global model module 721 may generate comparisons of the normalized energy consumption data with the normalized baseline energy consumption data for purposes of enabling a building manager to detect abnormal daily energy usage for the facility by comparing the normalized energy consumption data with the normalized baseline energy consumption data. In such a comparison, the global model module 721 may visually display an approximate expected range of normalized energy consumption values for a given time period as a function of the normalized baseline energy consumption data. In yet another embodiment, the global model module 721 may display the forecasted energy consumption for purposes of enabling a building manager to plan future energy acquisitions.

Numerous other embodiments may be configured for the global model module 721 as need arises for comparison of normalized energy consumption data with normalized baseline energy consumption data on a daily, weekly, monthly, yearly, etc. level, where the building manager may be presented with an expected normalized energy consumption profile (based on the normalized baseline data and the aforementioned components) along with what the given building actually consumed (based on the normalized consumption data) in the past, the near-real time present, or projected for the future. As noted above, the energy baselining system 700 according to the present invention may be employed to perform the above noted functions for a plurality of buildings.

The VEE processor 712, facility model processor 713, VEE configuration engine 731, and global model module 721 may comprise hardware, or a combination of hardware and software, configured to perform the functions described above. In one embodiment, the VEE processor 712, facility model processor 713, VEE configuration engine 731, and global model module 721 may comprise a plurality of microprocessors or other suitable central processing units (CPU) (not shown) coupled to a corresponding plurality of transitory random access memory (not shown) and/or a plurality of non-transitory read-only memory (not shown) within which application programs (i.e., software) are disposed that, when executed by the microprocessors/CPUs, perform the functions described above. The stores 714, 716, 741 may be disposed as conventional transitory or non-transitory data storage mechanisms and the buses within the system 700 may comprise conventional wired or wireless technology buses for transmission and reception of data including, but not limited to, direct wired (e.g., SATA), cellular, BLUETOOTH®, Wi-Fi, Ethernet, and the internet.

Figure 8:
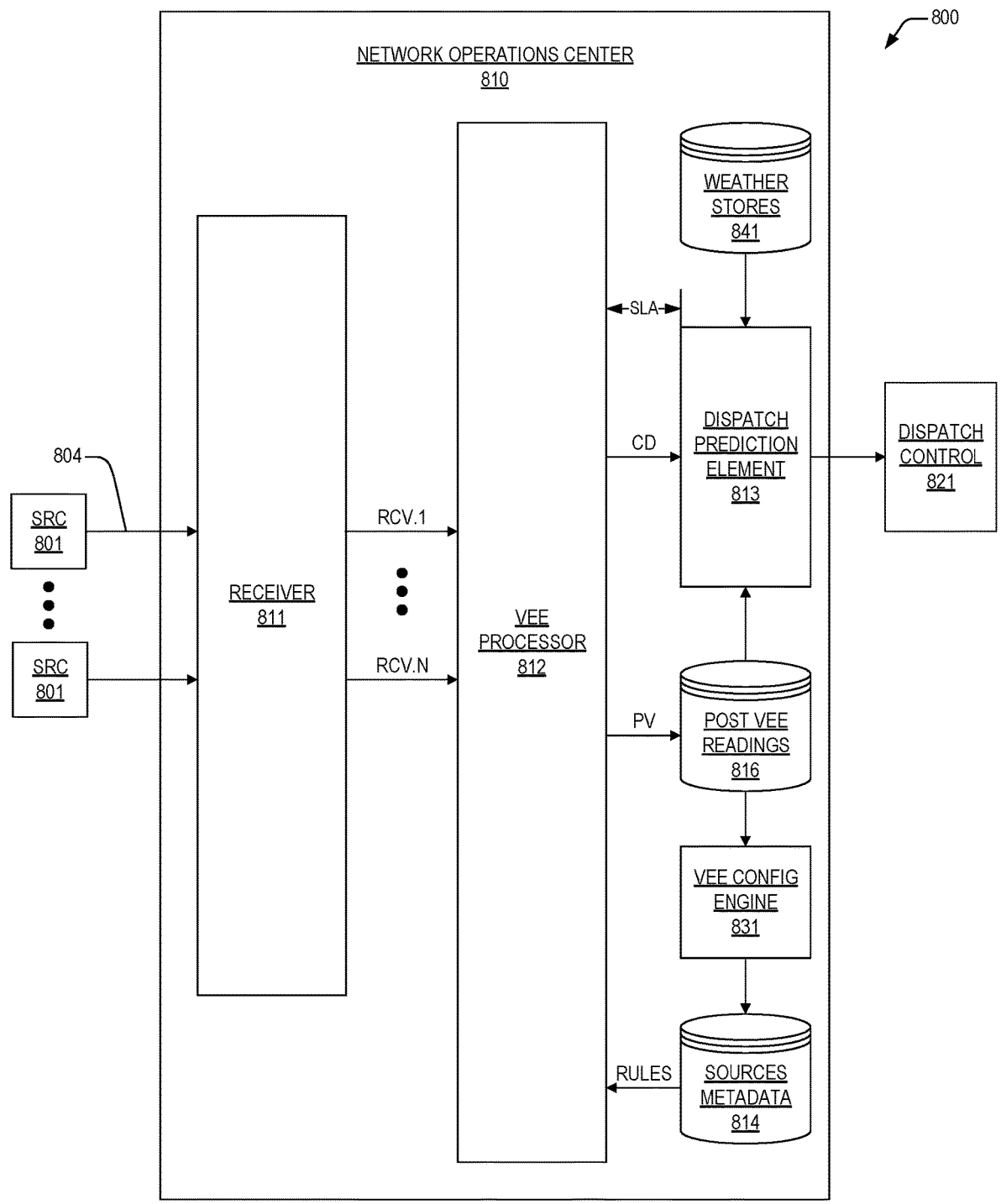
FIG. 8 is a block diagram a demand response dispatch prediction system according to the present invention that includes an automated VEE rules configuration engine.

Turning now to FIG. 8, a block diagram is presented illustrating demand response dispatch prediction system 800 according to the present invention that includes an automated VEE rules configuration engine 831. The system 800 includes representative metering sources 801 that generate and transmit the streams 804 such as one or more AMR meters, one or more building automation system (BAS) metering devices, and one or more other metering devices. The other metering devices may directly measure, generate, and transmit streams 804, or they may relay the streams 804, as in the case of a grid operator relaying streaming data to an ESCO. The streams 804 may be transmitted to the NOC 810 by any well-known streaming mechanism such as, but not limited to, wired or wireless networks, radio frequency networks, cellular networks, satellite communications, etc.

The NOC 810 comprises a receiver 811 that is coupled to each of the streams 804 and that performs the functions required to translate signals corresponding to each of the streams 804 into data that is suitable for VEE processing within the NOC 810. Accordingly, the receiver 811 is coupled to a VEE processor 812 via buses RCV.1-RCV.N, each of which comprises received and translated data for a corresponding one of the data streams 804. RCV.1-RCV.N are coupled to the VEE processor 812. The VEE processor 812 is coupled to a dispatch prediction element 813 via bus CD that is configured to predict a first future time when a demand response dispatch order may be received from a dispatch authority such as an ISO, RTO, or utility. The dispatch order may specify, among other things, a second future time to execute a demand response program event along with a value of energy that is to be shed by participants in a corresponding demand response program. A service level agreement (SLA) may be prescribed for processing of the streams 804 by the VEE processor 812, and may establish a maximum processing time from receipt of the streams 804 by the VEE processor 812 until post-VEE readings are provided to the dispatch prediction element 813. The dispatch prediction element 813 may be coupled to a dispatch controller 821, which may be internal or external to the NOC 810. In the dispatch prediction system 800, the dispatch controller 821 is depicted external to the NOC 810. A post-VEE readings stores 816 is coupled to the VEE processor 312 via bus PV and to the dispatch prediction element 813. A weather data stores 841 is coupled to the dispatch prediction element 813. A sources metadata stores 814 may be coupled to the VEE processor 812 via bus RULES. A VEE configuration engine 831 according to the present invention may be coupled to both the post-VEE readings stores 816 and the sources metadata stores 814.

In operation, the demand response dispatch prediction system 800 is employed to estimate cumulative energy consumption as a function of the predicted outside temperatures occurring in a timeline for a plurality of buildings corresponding to the streams 804 that participate in the demand response program, where VEE functions according to the present invention are utilized in generation of a cumulative energy consumption timeline. It is noted that, according to features of the present invention disclosed herein, the predicted energy consumption timeline may be employed to anticipate reception of a dispatch order to a finer level of granularity than that which has heretofore been provided, due to the increased accuracy of near real time energy consumption data. Thus, estimated reception of a dispatch order may be finely tuned. Advantageously, by utilizing the present invention to determine a time when a dispatch threshold of energy consumption will be reached due to outside temperature, an energy services company or other demand response dispatch control entity may be provided with, say, additional hours for preparation of dispatch control actions.

The system 800 generates a predicted dispatch time that is provided to the dispatch controller 821 for preparation of actions required to control each of the one or more buildings to optimally shed the energy specified in the dispatch order, upon reception of the dispatch order.

To predict the dispatch time, the dispatch prediction element 813 receives energy consumption data via bus CD and the post VEE readings stores 816. The prediction element 813 also accesses the weather stores 841 to obtain future outside temperatures corresponding to each of the plurality of buildings for a specified future time period. The dispatch predication element 813 then builds a cumulative future energy consumption timeline for all of the buildings using the outside temperatures as inputs to energy consumption models according to the present invention for all of the buildings. The dispatch prediction element 813 then processes the cumulative energy consumption timeline to determine a time when cumulative energy consumption increases as to cross a specified threshold known to trigger a demand response program event. The point at which consumption crosses the specified threshold is tagged as a dispatch time. From the dispatch time, the dispatch prediction element 813 may utilize demand response program contract data stored therein to calculate a predicted dispatch reception time, typically 24 hours prior to commencement of the demand response program event. The dispatch reception time is provided to the dispatch control element 821 to allow for commencement of dispatch actions at a time having greater accuracy than that which has heretofore been provided.

The NOC 810 may receive the energy consumption data streams 804, and may be constrained by SLA to perform VEE functions on the order of minutes. In one embodiment SLAs of approximately five minutes are contemplated, though other SLA processing times may be achieved according to the scope of the present disclosure. Accordingly, the streams 804 are received at the NOC 810 by the receiver 811, which translates signals in the streams 804 into data suitable for execution of VEE functions by the VEE processor 812. In one embodiment, interval times for the streams 804 may range from approximately one minute up to approximately 24 hours.

As a next interval value is translated for a given stream 804, the VEE processor 812 may employ detection rules to determine if the next interval value comprises an anomaly. If the next interval value is not an anomaly, then it is provided to the dispatch prediction element 813 over bus CD. The next interval value is also provided to the post-VEE readings stores 816 over bus PV, where it is available for functions executed by the facility model processor 813, and may also be accessed by the VEE configuration engine 831. If the next interval value is deemed an anomaly, then the VEE processor 812 may employ estimation and editing rules for the given stream 804 to replace (i.e., "edit") the next interval value with an estimated next interval value. The estimated next interval value may be provided to the dispatch prediction element 813 over bus CD. The estimated next interval value is also provided to the post-VEE readings stores 816 over bus PV, where it is available for functions executed by the dispatch prediction element 813. Each of the data streams 804 have a corresponding set of detection, estimation, and editing rules, which are provided by the sources metadata stores 814 to the VEE processor 412 over bus RULES.

When a new stream 804 is added, the VEE configuration engine 831 generates a default set of detection, estimation, and editing rules in the sources metadata stores 814 that corresponds to the new stream 804. Detection rules may comprise, but are not limited to, gap detection, zero value detection, negative reading detection, high-read (i.e., over threshold) detection, threshold setting, etc. Estimation rules may comprise, but are not limited to, average of N preceding and M subsequent interval values, replacement with values from previous day of the week, linear interpolation employing N preceding and M subsequent interval values, replace with data from same time previous week, replace with data from same time last week plus straight line interpolated constant, replace with data from same time previous day plus straight line interpolated constant, replace with average binned data from previous month (e.g., average of all 10:05 Monday interval values), replace with median binned data from previous month (e.g., median of all 10:05 Monday interval values), etc.

The VEE configuration engine 831 thereafter periodically accesses the post VEE readings stores 814 to analyze post VEE readings for the new stream 804 and for all other streams 804 processed by the NOC 810 to 1) adjust detection rules, 2) to group gaps in each stream 804 according to gap size (i.e. duration of contiguous anomalous intervals in each stream 804), and 3) to assign optimum estimation and editing rules for each gap size group in each of the streams 804. In one embodiment, the VEE configuration engine 831 performs these noted functions serially on one stream 804 at a time, until all streams 804 have been analyzed and their corresponding VEE rules have been updated. In one embodiment, the VEE configuration engine 831 performs its analysis and rules optimization functions continuously. In another embodiment, the VEE configuration engine 831 performs its analysis and rules optimization functions as a function of system processing load, where processing loads less than a threshold value enables the VEE configuration engine 831 to execute its functions, and processing loads greater than the threshold precludes execution of its functions. In one embodiment, the threshold is 50 percent. In a further embodiment, the VEE configuration engine 831 cycles serially through all the streams 804 every 24 hours. In yet a further embodiment, the VEE configuration engine 831 cycles serially through all the streams 804 every seven days. In yet another embodiment, the VEE configuration engine 831 cycles serially through all the streams once a month.

After a given stream 804 has been processed, the VEE configuration engine 831 updates VEE rules for the stream 804 in the sources metadata stores to replace previous VEE rules with updated, optimized VEE rules.

The VEE processor 812, dispatch prediction element 813, VEE configuration engine 831, and dispatch controller 821 may comprise hardware, or a combination of hardware and software, configured to perform the functions described above. In one embodiment, the VEE processor 812, dispatch prediction element 813, VEE configuration engine 831, and dispatch controller 821 may comprise a plurality of microprocessors or other suitable central processing units (CPU) (not shown) coupled to a corresponding plurality of transitory random access memory (not shown) and/or a plurality of non-transitory read-only memory (not shown) within which application programs (i.e., software) are disposed that, when executed by the microprocessors/CPUs, perform the functions described above. The stores 814, 816, 841 may be disposed as conventional transitory or non-transitory data storage mechanisms and the buses within the system 800 may comprise conventional wired or wireless technology buses for transmission and reception of data including, but not limited to, direct wired (e.g., SATA), cellular, BLUETOOTH®, Wi-Fi, Ethernet, and the internet.

Figure 9:
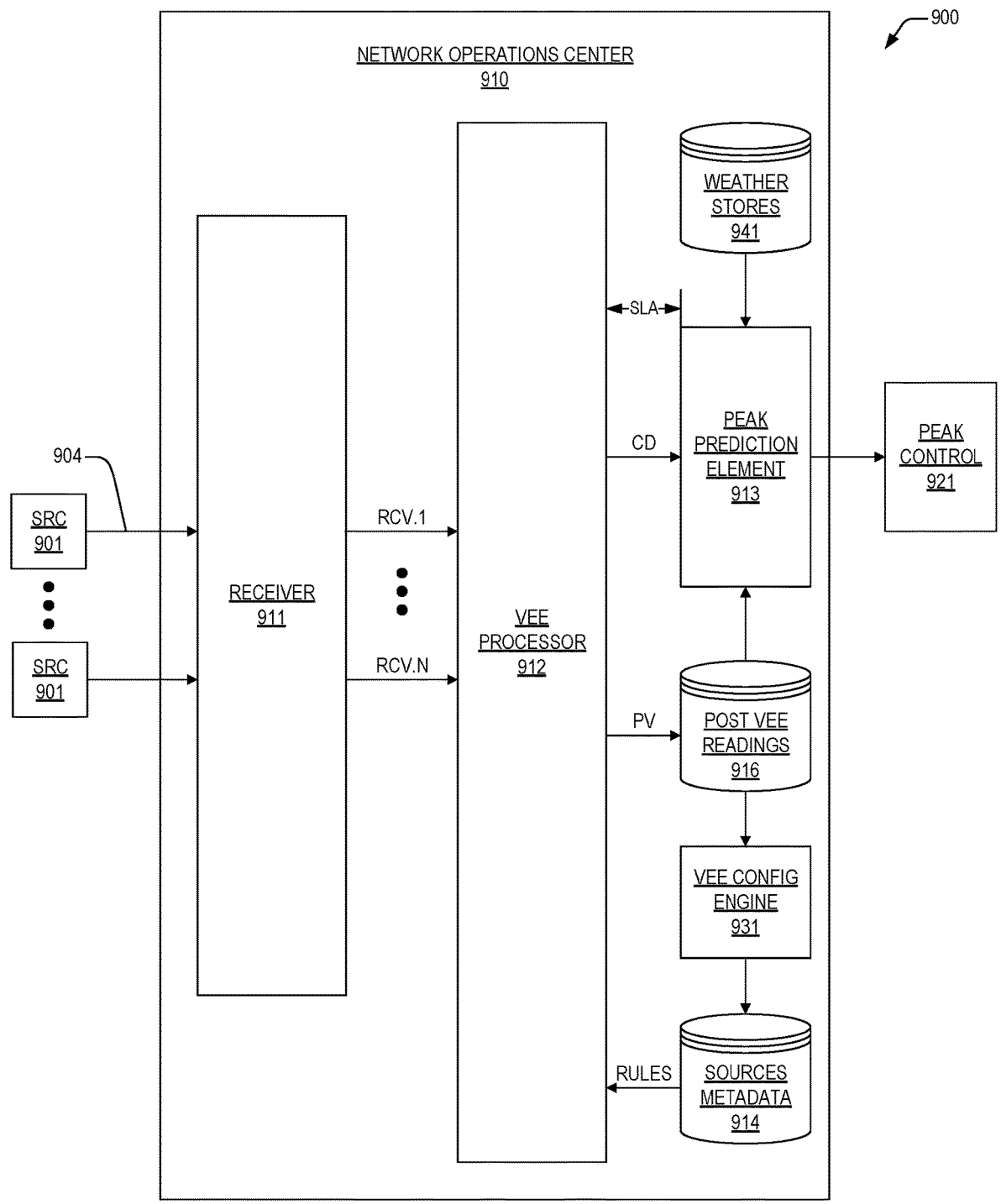
FIG. 9 is a block diagram featuring a brown out prediction system according to the present invention that includes an automated VEE rules configuration engine.

Referring now to FIG. 9, a block diagram is presented featuring a brown out prediction system 900 according to the present invention that includes an automated VEE rules configuration engine 931. The system 900 includes representative metering sources 901 that generate and transmit the streams 904 such as one or more AMR meters, one or more building automation system (BAS) metering devices, and one or more other metering devices. The other metering devices may directly measure, generate, and transmit streams 904, or they may relay the streams 904, as in the case of a grid operator relaying streaming data to an ESCO. The streams 904 may be transmitted to the NOC 910 by any well-known streaming mechanism such as, but not limited to, wired or wireless networks, radio frequency networks, cellular networks, satellite communications, etc.

The NOC 910 comprises a receiver 911 that is coupled to each of the streams 904 and that performs the functions required to translate signals corresponding to each of the streams 904 into data that is suitable for VEE processing within the NOC 910. Accordingly, the receiver 911 is coupled to a VEE processor 912 via buses RCV.1-RCV.N, each of which comprises received and translated data for a corresponding one of the data streams 904. RCV.1-RCV.N are coupled to the VEE processor 912. The VEE processor 912 is coupled to a peak prediction element 913 via bus CD that that is configured to predict a future brown out time when energy consumption on a grid controlled by an ISO, RTO, or utility, may exceed normal production capacity, and would thereby require exceptional measures known in the art to increase energy capacity. A service level agreement (SLA) may be prescribed for processing of the streams 904 by the VEE processor 912, and may establish a maximum processing time from receipt of the streams 904 by the VEE processor 912 until post-VEE readings are provided to the dispatch prediction element 913. The peak prediction element 913 may be coupled to a peak controller 921, which may be internal or external to the NOC 910. In the brown out prediction system 900, the peak controller 921 is depicted external to the NOC 910. A post-VEE readings stores 916 is coupled to the VEE processor 312 via bus PV and to the peak prediction element 913. A weather data stores 941 is coupled to the dispatch prediction element 913. A sources metadata stores 914 may be coupled to the VEE processor 912 via bus RULES. A VEE configuration engine 931 according to the present invention may be coupled to both the post-VEE readings stores 916 and the sources metadata stores 914. The weather stores 941 comprises weather predictions that include outside temperatures corresponding to buildings corresponding to the streams 904. The weather stores 941 may be located on site, or may be located remotely and accessed via conventional networking technologies.

In operation, the brown out prediction system 900 is employed to estimate cumulative energy consumption on a grid as a function of the predicted outside temperatures occurring in a timeline for a plurality of buildings corresponding to the streams 904 within the grid, where VEE functions according to the present invention are utilized in generation of a cumulative energy consumption timeline. It is noted that, according to features of the present invention disclosed herein, the predicted energy consumption timeline may be employed to anticipate a brown out time to a finer level of granularity than that which has heretofore been provided, due to the increased accuracy of near real time energy consumption data. Thus, the system 900 generates a predicted brown out time that is provided to the peak controller 921 for preparation of exceptional measures required to manage peak consumption, such as initialization of surge production plants, etc.

To predict the brown out time, the peak prediction element 913 receives energy consumption data via bus CD and the post VEE readings stores 916. The prediction element 913 also accesses the weather stores 941 to obtain future outside temperatures corresponding to each of the plurality of buildings for a specified future time period. The peak predication element 913 then builds a cumulative future energy consumption timeline for all of the buildings using the outside temperatures as inputs to energy consumption models according to the present invention for all of the buildings. The peak prediction element 913 then processes the cumulative energy consumption timeline to determine a time when cumulative energy consumption increases as to cross a specified threshold known to trigger exceptional measures to preclude a brown out. The point at which consumption crosses the specified threshold is tagged as a brown out time. The brown out time is then provided to the peak controller 921, which in triggers the exceptional measures to preclude a brown out.

The NOC 910 may receive the energy consumption data streams 904, and may be constrained by SLA to perform VEE functions on the order of minutes. In one embodiment SLAs of approximately five minutes are contemplated, though other SLA processing times may be achieved according to the scope of the present disclosure. Accordingly, the streams 904 are received at the NOC 910 by the receiver 911, which translates signals in the streams 904 into data suitable for execution of VEE functions by the VEE processor 912. In one embodiment, interval times for the streams 904 may range from approximately one minute up to approximately 24 hours.

As a next interval value is translated for a given stream 904, the VEE processor 912 may employ detection rules to determine if the next interval value comprises an anomaly. If the next interval value is not an anomaly, then it is provided to the dispatch prediction element 913 over bus CD. The next interval value is also provided to the post-VEE readings stores 916 over bus PV, where it is available for functions executed by the facility model processor 913, and may also be accessed by the VEE configuration engine 931. If the next interval value is deemed an anomaly, then the VEE processor 912 may employ estimation and editing rules for the given stream 904 to replace (i.e., "edit") the next interval value with an estimated next interval value. The estimated next interval value may be provided to the peak prediction element 913 over bus CD. The estimated next interval value is also provided to the post-VEE readings stores 916 over bus PV, where it is available for functions executed by the peak prediction element 913. Each of the data streams 904 have a corresponding set of detection, estimation, and editing rules, which are provided by the sources metadata stores 914 to the VEE processor 912 over bus RULES.

When a new stream 904 is added, the VEE configuration engine 931 generates a default set of detection, estimation, and editing rules in the sources metadata stores 914 that corresponds to the new stream 904. Detection rules may comprise, but are not limited to, gap detection, zero value detection, negative reading detection, high-read (i.e., over threshold) detection, threshold setting, etc. Estimation rules may comprise, but are not limited to, average of N preceding and M subsequent interval values, replacement with values from previous day of the week, linear interpolation employing N preceding and M subsequent interval values, replace with data from same time previous week, replace with data from same time last week plus straight line interpolated constant, replace with data from same time previous day plus straight line interpolated constant, replace with average binned data from previous month (e.g., average of all 10:05

Monday interval values), replace with median binned data from previous month (e.g., median of all 10:05 Monday interval values), etc.

The VEE configuration engine 931 thereafter periodically accesses the post VEE readings stores 914 to analyze post VEE readings for the new stream 904 and for all other streams 904 processed by the NOC 910 to 1) adjust detection rules, 2) to group gaps in each stream 904 according to gap size (i.e. duration of contiguous anomalous intervals in each stream 904), and 3) to assign optimum estimation and editing rules for each gap size group in each of the streams 904. In one embodiment, the VEE configuration engine 931 performs these noted functions serially on one stream 904 at a time, until all streams 904 have been analyzed and their corresponding VEE rules have been updated. In one embodiment, the VEE configuration engine 931 performs its analysis and rules optimization functions continuously. In another embodiment, the VEE configuration engine 931 performs its analysis and rules optimization functions as a function of system processing load, where processing loads less than a threshold value enables the VEE configuration engine 931 to execute its functions, and processing loads greater than the threshold precludes execution of its functions. In one embodiment, the threshold is 50 percent. In a further embodiment, the VEE configuration engine 931 cycles serially through all the streams 904 every 24 hours. In yet a further embodiment, the VEE configuration engine 931 cycles serially through all the streams 904 every seven days. In yet another embodiment, the VEE configuration engine 931 cycles serially through all the streams once a month.

After a given stream 904 has been processed, the VEE configuration engine 931 updates VEE rules for the stream 904 in the sources metadata stores to replace previous VEE rules with updated, optimized VEE rules.

The VEE processor 912, peak prediction element 913, VEE configuration engine 931, and peak controller 921 may comprise hardware, or a combination of hardware and software, configured to perform the functions described above. In one embodiment, the VEE processor 912, peak prediction element 913, VEE configuration engine 931, and peak controller 921 may comprise a plurality of microprocessors or other suitable central processing units (CPU) (not shown) coupled to a corresponding plurality of transitory random access memory (not shown) and/or a plurality of non-transitory read-only memory (not shown) within which application programs (i.e., software) are disposed that, when executed by the microprocessors/CPUs, perform the functions described above. The stores 914, 916, 941 may be disposed as conventional transitory or non-transitory data storage mechanisms and the buses within the system 900 may comprise conventional wired or wireless technology buses for transmission and reception of data including, but not limited to, direct wired (e.g., SATA), cellular, BLUETOOTH®, Wi-Fi, Ethernet, and the internet.

Figure 10:
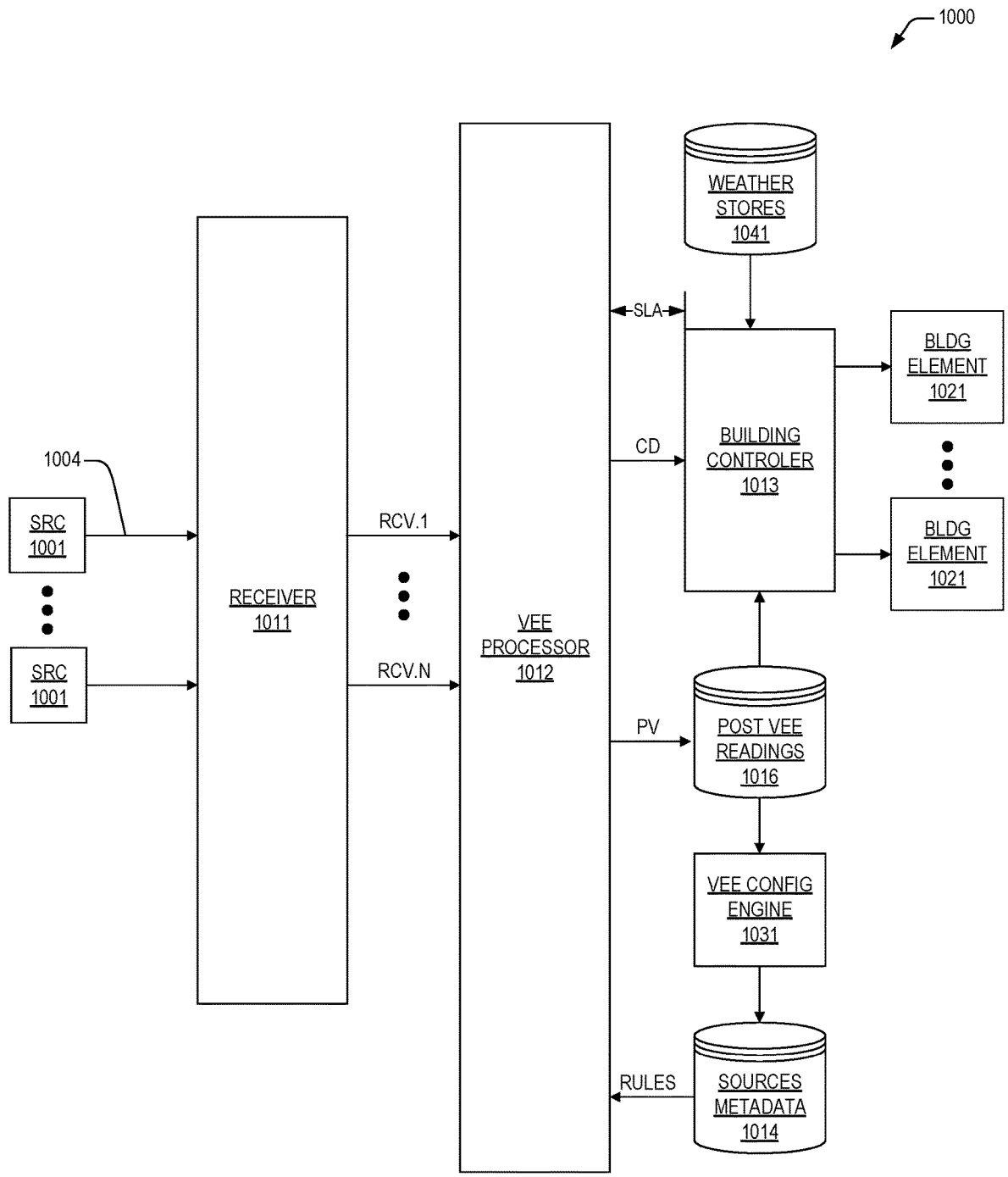
FIG. 10 is a block diagram showing an automated building control system according to the present invention that includes an automated VEE rules configuration engine.

Finally referring to FIG. 10, a block diagram is presented showing an automated building control system 1000 according to the present invention that includes an automated VEE rules configuration engine 1031. The system 1000 includes representative metering sources 1001 that generate and transmit the streams 1004 such as one or more AMR meters, one or more building automation system (BAS) metering devices, and one or more other metering devices, where the streams 1004 correspond to a plurality of metering points 1001 within one or more buildings that are under control of the system 1000. The metering points 1001 may directly measure, generate, and transmit streams 1004, or they may relay the streams 1004, as in the case of a grid operator relaying streaming data to an ESCO. The streams 1004 may be transmitted to the NOC 1010 by any well-known streaming mechanism such as, but not limited to, wired or wireless networks, radio frequency networks, cellular networks, satellite communications, etc.

The NOC 1010 comprises a receiver 1011 that is coupled to each of the streams 1004 and that performs the functions required to translate signals corresponding to each of the streams 1004 into data that is suitable for VEE processing within the NOC 1010. Accordingly, the receiver 1011 is coupled to a VEE processor 1012 via buses RCV.1-RCV.N, each of which comprises received and translated data for a corresponding one of the data streams 1004. RCV.1-RCV.N are coupled to the VEE processor 1012. The VEE processor 1012 is coupled to a building controller 1013 via bus CD. A service level agreement (SLA) may be prescribed for processing of the streams 1004 by the VEE processor 1012, and may establish a maximum processing time from receipt of the streams 1004 by the VEE processor 1012 until post-VEE readings are provided to the building controller 1013. The building controller 1013 may be coupled to a one or more controllable building elements 1021 within the one or more buildings, or that correspond to the one or more buildings. The building elements may include, but are not limited to, lighting system sensors and components, heating system sensors and components, air conditioning system sensors and components, security system sensors and components, transport devices, traffic control devices, power generation and distribution sensors and components, etc. A post-VEE readings stores 1016 is coupled to the VEE processor 312 via bus PV and to the building controller 1013. A weather data stores 1041 is coupled to the building controller 1013. A sources metadata stores 1014 may be coupled to the VEE processor 1012 via bus RULES. A VEE configuration engine 1031 according to the present invention may be coupled to both the post-VEE readings stores 1016 and the sources metadata stores 1014.

In operation, the NOC 1010 may receive the energy consumption data streams 1004, and may be constrained by SLA to perform VEE functions on the order of minutes. In one embodiment SLAs of approximately five minutes are contemplated, though other SLA processing times may be achieved according to the scope of the present disclosure. Accordingly, the streams 1004 are received at the NOC 1010 by the receiver 1011, which translates signals in the streams 1004 into data suitable for execution of VEE functions by the VEE processor 1012. In one embodiment, interval times for the streams 1004 may range from approximately one minute up to approximately 24 hours.

As a next interval value is translated for a given stream 1004, the VEE processor 1012 may employ detection rules to determine if the next interval value comprises an anomaly. If the next interval value is not an anomaly, then it is provided to the facility model processor 1013 over bus CD. The next interval value is also provided to the post-VEE readings stores 1016 over bus PV, where it is available for functions executed by the building controller 1013, and may also be accessed by the VEE configuration engine 1031. If the next interval value is deemed an anomaly, then the VEE processor 1012 may employ estimation and editing rules for the given stream 1004 to replace (i.e., "edit") the next interval value with an estimated next interval value. The estimated next interval value may be provided to the building controller 1013 over bus CD. The estimated next interval value is also provided to the post-VEE readings stores 1016 over bus PV, where it is available for functions executed by the facility model processor 1013. Each of the data streams 1004 have a corresponding set of detection, estimation, and editing rules, which are provided by the sources metadata stores 1014 to the VEE processor 1012 over bus RULES.

When a new stream 1004 is added, the VEE configuration engine 1031 generates a default set of detection, estimation, and editing rules in the sources metadata stores 1014 that corresponds to the new stream 1004. Detection rules may comprise, but are not limited to, gap detection, zero value detection, negative reading detection, high-read (i.e., over threshold) detection, threshold setting, etc. Estimation rules may comprise, but are not limited to, average of N preceding and M subsequent interval values, replacement with values from previous day of the week, linear interpolation employing N preceding and M subsequent interval values, replace with data from same time previous week, replace with data from same time last week plus straight line interpolated constant, replace with data from same time previous day plus straight line interpolated constant, replace with average binned data from previous month (e.g., average of all 10:05 Monday interval values), replace with median binned data from previous month (e.g., median of all 10:05 Monday interval values), etc.

The VEE configuration engine 1031 thereafter periodically accesses the post VEE readings stores 1014 to analyze post VEE readings for the new stream 1004 and for all other streams 1004 processed by the NOC 1010 to 1) adjust detection rules, 2) to group gaps in each stream 1004 according to gap size (i.e. duration of contiguous anomalous intervals in each stream 1004), and 3) to assign optimum estimation and editing rules for each gap size group in each of the streams 1004. In one embodiment, the VEE configuration engine 1031 performs these noted functions serially on one stream 1004 at a time, until all streams 1004 have been analyzed and their corresponding VEE rules have been updated. In one embodiment, the VEE configuration engine 1031 performs its analysis and rules optimization functions continuously. In another embodiment, the VEE configuration engine 1031 performs its analysis and rules optimization functions as a function of system processing load, where processing loads less than a threshold value enables the VEE configuration engine 1031 to execute its functions, and processing loads greater than the threshold precludes execution of its functions. In one embodiment, the threshold is 50 percent. In a further embodiment, the VEE configuration engine 1031 cycles serially through all the streams 1004 every 24 hours. In yet a further embodiment, the VEE configuration engine 1031 cycles serially through all the streams 1004 every seven days. In yet another embodiment, the VEE configuration engine 1031 cycles serially through all the streams once a month.

After a given stream 1004 has been processed, the VEE configuration engine 1031 updates VEE rules for the stream 1004 in the sources metadata stores to replace previous VEE rules with updated, optimized VEE rules.

In operation, the building control system 1000 according to the present invention may be employed for purposes of generating an accurate energy consumption model for the building (or plurality of buildings) having time increments of two hours or less (i.e., 1-hour increments, 30-minute increments, 15-minute increments, etc.). The building controller 1013 may develop and dynamically revise the energy consumption model based on energy consumption data provided over bus CD and from post VEE readings to control overall energy consumption of systems within the building (or plurality of buildings) by minimizing peak demand and surges while maintaining optimum comfort and operating conditions. The energy consumption may be controlled by scheduling run times for one or more of the building elements 1021 by techniques known in the art to minimize peak demand and time of use charges, or to achieve energy efficiency incentives. The building controller 1013 may additionally forecast energy consumption for future times by employing data (as edited by the VEE processor 1012) provided over CD and post VEE readings in conjunction with weather forecast data provided by the weather data stores 1041 and may schedule run times for one or more of the building elements 1021 as a function of the weather forecast data.

The building controller 1013 may optimize the energy consumption of the building for comfort purposes prior to or during demand response program events (e.g., load shedding), to preclude time of use charges, or to achieve energy reduction incentives. The building controller 1013 may employ the post VEE readings and near real-time energy consumption data provided via bus CD, to develop modeling components indicative of a daily occupancy level for the building (or plurality of buildings) and may perform comfort control functions, security control functions, resource control functions, market control functions, advertising functions, and other control functions based upon the determined daily occupancy level, where the daily occupancy level is determined exclusively from the energy consumption data, outside temperature data, and the aforementioned model components.

The VEE processor 1012, building controller 1013, VEE configuration engine 1031, and building elements 1021 may comprise hardware, or a combination of hardware and software, configured to perform the functions described above. In one embodiment, the VEE processor 1012, building controller 1013, VEE configuration engine 1031, and building elements 1021 may comprise a plurality of microprocessors or other suitable central processing units (CPU) (not shown) coupled to a corresponding plurality of transitory random access memory (not shown) and/or a plurality of non-transitory read-only memory (not shown) within which application programs (i.e., software) are disposed that, when executed by the microprocessors/CPUs, perform the functions described above. The stores 1014, 1016, 1041 may be disposed as conventional transitory or non-transitory data storage mechanisms and the buses within the system 1000 may comprise conventional wired or wireless technology buses for transmission and reception of data including, but not limited to, direct wired (e.g., SATA), cellular, BLUETOOTH®, Wi-Fi, Ethernet, and the internet.

Advantageously, the present invention provides for markedly increased real time and near real time VEE accuracies through simultaneous optimization of detection, estimation, and editing rules as a function the duration of anomalies for specific streaming devices and transport technologies, while eliminating costly data analyst requirements.

The present invention furthermore may be employed to perform VEE functions corresponding to other commodities such as, but not limited to, water, natural gas, coal, nuclear energy, fuel, etc. where usage data is obtained from streaming sources and where increased real time or near real time accuracy of usage data is desired.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. An apparatus for configuring validation, estimation, and editing (VEE) rules for performing VEE on interval-based energy consumption streams, the apparatus comprising:
   a post VEE readings data stores, configured to provide tagged energy consumption data sets that are each associated with a corresponding one of the interval-based energy consumption streams, each of said tagged energy consumption data sets comprising groups of contiguous interval values tagged as having been validated;
   a rules processor, configured to read said post VEE readings data stores upon initiation of an event and, for said each of said tagged energy consumption data sets, configured to create anomalies having different durations using only said groups of contiguous interval values, said groups of contiguous interval values corresponding to correct data, and configured to generate estimates for said anomalies by employing estimation techniques for each of said different durations and, for said each of said different durations, configured to select a corresponding one of said estimation techniques for subsequent employment when performing VEE of subsequent energy consumption data associated with said each of said different durations for said corresponding one of the interval based energy consumption streams; and
   a process control element, coupled to said post VEE readings stores, wherein the process control element executes functions on the interval-based energy consumption streams translated by said rules processor, and directs one or more system elements to change state.

2. The apparatus as recited in claim 1, wherein said corresponding one of said estimation techniques is selected because its corresponding estimates are more accurate than estimates generated by remaining ones of said estimation techniques.

3. The apparatus as recited in claim 1, wherein said rules processor updates the estimation rules for all of the interval based energy consumption streams in parallel with real time processing of the interval-based energy consumption streams within a network operations center, and wherein the interval based energy consumption streams are processed serially by said rules processor.

4. The apparatus as recited in claim 3, wherein VEE for the interval-based energy consumption streams must be completed within five minutes, and wherein the interval-based energy consumption streams comprise more than 10,000 interval-based energy consumption streams.

5. The apparatus as recited in claim 1, wherein said estimation techniques comprise 10 or more estimation techniques.

6. The apparatus as recited in claim 1, wherein said event is signaled by a timer set to a periodic interval.

7. The apparatus as recited in claim 6, wherein said periodic interval comprises 24 hours.

8. An apparatus for configuring validation, estimation, and editing (VEE) rules for performing VEE on interval-based energy consumption streams, the apparatus comprising:
   a sources metadata stores, configured to provide said rules corresponding to each of the interval-based energy consumption streams for performing VEE;
   a post VEE readings data stores, configured to provide tagged energy consumption data sets that are each associated with a corresponding one of the interval-based energy consumption streams, each of said tagged energy consumption data sets comprising groups of contiguous interval values tagged as having been validated;
   a rules processor, configured to read said post VEE readings data stores upon initiation of an event and, for said each of said tagged energy consumption data sets, configured to create anomalies having a plurality of different durations using only said groups of contiguous interval values, said groups of contiguous interval values corresponding to correct data, and configured to generate estimates for said anomalies by employing estimation techniques for each of said different durations and, for said each of said different durations, configured to select a corresponding one of said estimation techniques for subsequent employment when performing VEE of subsequent energy consumption data associated with said each of said different durations for said corresponding one of the interval based energy consumption streams, and configured to update said sources metadata stores with said one of said estimation techniques; and a process control element, coupled to said post VEE readings stores, wherein the process control element executes functions on the interval-based energy consumption streams translated by said rules processor, and directs one or more system elements to change state.

9. The apparatus as recited in claim 8, wherein said corresponding one of said estimation techniques is selected because its corresponding estimates are more accurate than estimates generated by remaining ones of said estimation techniques.

10. The apparatus as recited in claim 8, wherein said rules processor updates said sources metadata stores with the estimation rules for all of the interval based energy consumption streams in parallel with real time processing of the interval based energy consumption streams within a network operations center, and wherein the interval based energy consumption streams are processed serially by said rules processor.

11. The apparatus as recited in claim 10, wherein VEE for the interval-based energy consumption streams must be completed within five minutes, and wherein the interval-based energy consumption streams comprise more than 10,000 interval-based energy consumption streams.

12. The apparatus as recited in claim 8, wherein said estimation techniques comprise 10 or more estimation techniques.

13. The apparatus as recited in claim 8, wherein said event is signaled by a timer set to a periodic interval.

14. The apparatus as recited in claim 13, wherein said periodic interval comprises 24 hours.

15. A method for configuring validation, estimation, and editing (VEE) rules for performing VEE on interval-based energy consumption streams, the method comprising:

providing tagged energy consumption data sets that are each associated with a corresponding one of the interval-based energy consumption streams, each of the tagged energy consumption data sets comprising groups of contiguous interval values tagged as having been validated;

reading the post VEE readings data stores upon initiation of an event;

for the each of the tagged energy consumption data sets, creating anomalies having different durations using only the groups of contiguous interval values, the groups of contiguous interval values corresponding to correct data;

generating estimates for the anomalies by employing estimation techniques for each of the different durations;

for each of the different durations, selecting a corresponding one of the estimation techniques for subsequent employment when performing VEE of subsequent energy consumption data associated with the each of the different durations for the corresponding one of the interval-based energy consumption streams; and executing functions on the interval-based energy consumption streams and directing one or more system elements to change state.

16. The method as recited in claim 15, wherein the corresponding one of the estimation techniques is selected because its corresponding estimates are more accurate than estimates generated by remaining ones of the estimation techniques.

17. The method as recited in claim 15, wherein the estimation rules for all of the interval based energy consumption streams are updated in parallel with real time processing of the interval based energy consumption streams within a network operations center, and wherein the interval based energy consumption streams are processed serially by the rules processor.

18. The method as recited in claim 17, wherein VEE for the interval-based energy consumption streams must be completed within five minutes, and wherein the interval-based energy consumption streams comprise more than 10,000 interval-based energy consumption streams.

19. The method as recited in claim 15, wherein the estimation techniques comprise 10 or more estimation techniques.

20. The method as recited in claim 15, wherein the event is signaled by a timer set to a periodic interval.

* * * * *